United States Patent
Berger et al.

(10) Patent No.: US 7,808,502 B2
(45) Date of Patent: *Oct. 5, 2010

(54) PERSPECTIVE EDITING TOOLS FOR 2-D IMAGES

(75) Inventors: Ralf Berger, Acton, MA (US); Steve M. Troppoli, Carlisle, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/202,165

(22) Filed: Aug. 29, 2008

(65) Prior Publication Data

US 2008/0317387 A1    Dec. 25, 2008

Related U.S. Application Data

(63) Continuation of application No. 10/974,547, filed on Oct. 26, 2004, now Pat. No. 7,425,958.

(60) Provisional application No. 60/622,214, filed on Oct. 25, 2004.

(51) Int. Cl.
*G09G 5/00* (2006.01)
*G06T 15/00* (2006.01)
*G06F 3/048* (2006.01)
*G06F 3/00* (2006.01)
*G06K 9/00* (2006.01)
*G06T 11/60* (2006.01)
*G06T 11/00* (2006.01)
*G06F 17/00* (2006.01)
*G06T 15/20* (2006.01)

(52) U.S. Cl. .............. 345/427; 345/581; 345/619; 345/660; 345/654; 358/537; 358/538; 358/452; 358/453; 382/282; 382/295; 382/298; 382/311; 715/700; 715/764; 715/788; 715/800

(58) Field of Classification Search ............... 382/254, 382/269, 274, 276–277, 302, 311; 345/639, 345/620; 358/528, 537, 538, 448, 452–453, 358/449, 451
See application file for complete search history.

(56) References Cited

U.S. PATENT DOCUMENTS

| | | | | |
|---|---|---|---|---|
| 5,130,789 A | * | 7/1992 | Dobbs et al. | ............... 358/500 |
| 5,594,845 A | | 1/1997 | Florent et al. | |
| 7,327,374 B2 | | 2/2008 | Oh et al. | |
| 2004/0095357 A1 | * | 5/2004 | Oh et al. | ............... 345/589 |
| 2004/0217975 A1 | | 11/2004 | Oh et al. | |

FOREIGN PATENT DOCUMENTS

JP    200057378    2/2000

OTHER PUBLICATIONS

Macromedia Freehand Version 5.0 User Manual, 1994, pp. 160-161, 168, 184.

(Continued)

*Primary Examiner*—Wesner Sajous
(74) *Attorney, Agent, or Firm*—Fish & Richardson P.C.

(57) ABSTRACT

Methods and apparatus, including computer systems and program products, to provide an image editing application including a perspective editing tool for performing edits in regions of an image having perspective. The perspective editing tool enables the user to identify one or more regions having perspective, i.e., perspective areas. The user can perform various editing operations on an object such that the edited object conforms to the perspective of the perspective area. The image editing application can also automatically create a perspective area from an existing perspective area. The editing tool enables the user to move objects from a source perspective area to a destination perspective area such that the edited object conforms to the perspective of the destination perspective area.

14 Claims, 29 Drawing Sheets

OTHER PUBLICATIONS

Macromedia Freehand Training from the Source, 2002, pp. 205-219.

Office Action of Notice of Reason for Rejection dated Feb. 8, 2010 from related Japanese Patent Application No. 2005-309145, 2 pages.

Office Action of Notice of Reason for Rejection dated Feb. 8, 2010 from related Japanese Patent Application No. 2008-195389, 1 page.

* cited by examiner

PERSPECTIVE EDITING TOOLS FOR 2-D IMAGES

CROSS-REFERENCE TO RELATED APPLICATIONS

This application is a continuation and claims benefit under 35 U.S.C. §120 of U.S. application Ser. No. 10/974,547, filed on Oct. 26, 2004, which claims the benefit of 60/622,214, filed on Oct. 25, 2004. The disclosure of the prior applications are considered part of, and are incorporated by reference, in the disclosure of this application.

BACKGROUND

The present application relates to editing tools for editing two-dimensional (2-D) digital images.

Image editing applications provide editing tools that enable a user to modify a 2-D image, e.g., a digital photograph image. Typical editing tools include a selection tool for selecting a region or object in the image, a copy tool to copy selected objects, a paste tool to paste an object copied from the image or an external object (e.g., an object copied from another image source) into the image, and image modification tools that enable the user to change the color, shape, size, or proportion of a selected object.

Editing tools for 2-D images operate in the plane of the image because the image editing applications operate on the assumption that the image is coplanar to the camera's focal plane. However, the image may contain elements that are 2-D representations of three-dimensional (3-D) objects and have a perspective that affects their appearance based on their distance from the camera. The editing tools do not account for the perspective, which can make regions of the image having perspective challenging to edit.

SUMMARY

The present invention provides methods and apparatus, including computer program products, that implement techniques to provide a perspective editing tool for performing edits in regions of an image having perspective.

The perspective editing tool enables the user to identify one or more regions in a 2-D image having perspective, i.e., perspective areas. The user can perform various editing operations on an object such that the edited object conforms to the perspective of the perspective area.

The image editing application can create a definition for a perspective area based on vanishing points of the perspective area and a perimeter enclosing the area. The definition of the perspective plane can be defined by a destination perspective plane that is not the picture plane. The perspective plane can also be defined by a transformation that maps from the perspective area to a unit square and a transformation that maps from the unit square back to the perspective area. The transformation can be represented by matrices.

The application enables the user to perform editing operations such as placing an object into the perspective area and transforming the object to have a destination size and shape calculated based on the definition of the perspective area. The object can be from the perspective area, from another perspective area, or from outside any perspective area in the image. When the object is from another perspective area, the application calculates the destination shape for the object based on an association of the object with the definition of the source perspective area. Also, the size and shape of tools can be transformed based on the definition of the perspective area, and the effects provided by such tools can be affected accordingly.

In one implementation, the application enables the user to create a perspective area based on an already-defined perspective area in the image, where the two perspective areas share an edge. The application calculates a definition for the new perspective area based on the definition of the already-defined perspective area. The application can then transform objects moved into the new perspective area based on the calculated definition for the new perspective area. The application can calculate a metric, e.g., an aspect ratio, for the new perspective area based on a metric associated with the already-defined perspective area.

In another aspect, the application enables the user to constrain the movement of an object within a perspective area in a direction corresponding to a ray terminating at one of the vanishing points defining the perspective area. The application can also constrain the movement from one perspective area to another perspective area on a ray corresponding to the ray on the other perspective area.

The techniques described in this specification can be implemented to realize one or more of the following advantages. The techniques can be used to edit an image in a region having perspective, e.g., by moving an object in the region, without having to manually conform the object to the perspective of the region. Also, the application enables the user to generate multiple related perspective areas on the image and move objects between such areas while conforming the appearance of the object to the perspective of the destination perspective area.

BRIEF DESCRIPTION OF THE DRAWINGS

Like reference numbers and designations in the various drawings indicate like elements.

DETAILED DESCRIPTION

Figure 1:
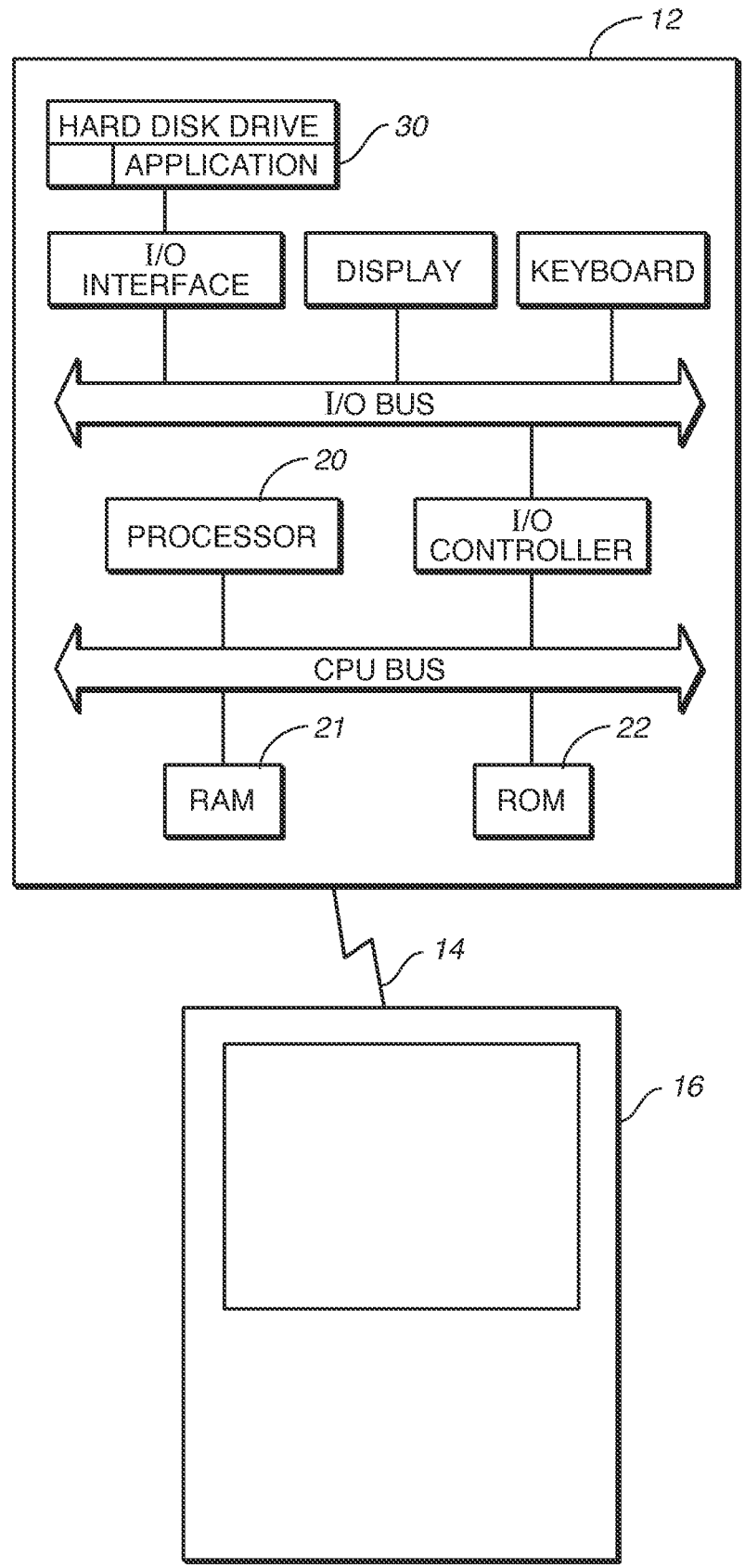
FIG. 1 is a block diagram of a computer system suitable for performing perspective editing operations.

FIG. 1 shows a computer system 10 suitable for performing perspective editing operations. The computer system 10 includes one or more digital computers 12, a communications bus 14 and an output display device 16. Digital computer 12 can be a personal computer or a workstation; it can be local to the user performing the editing or remote from the user. For example, the system 10 can include a server computer communicating with a client computer. Digital computer 12 typically includes a microprocessor 20, a memory bus, random access memory (RAM) 21, read only memory (ROM) 22, peripherals such as input devices (e.g., keyboard, pointing device), and storage devices (e.g., floppy disk drive, hard disk drive). The storage devices typically include an operating system and one or more applications including an image editing application 30.

The image editing application 30 provides editing tools that enable a user to perform various editing operations on a 2-D image, e.g., a digital photograph image. The editing tools include a selection tool, with which the user can select an area in the image. The area may include an object the user wishes to copy or modify. The user can perform a number of editing operations on the selected object. For example, the user can move the selected object from its original location in the image to a different location in the image or make a copy of the object and paste the copy at a destination location. Other editing operations the user can perform on the object include, for example, rotating or flipping the object, warping the object to change its size or shape. The editing tools may also include a paint brush with which the user can "paint" over areas of the image and a clone brush that enables the user to remove an unwanted object by painting over the object with nearby pixels from the background.

Typically, editing tools perform edits in the plane of the 2-D image, without regard to the perspective of elements in the image. This makes it difficult to perform edits that provide a realistic representation of the edited object in the image. To conform an object to the perspective of a region in the image, the user must perform numerous editing operations, which may include resizing, stretching and other warping operations to approach a realistic rendering of the edited object. FIG. 2 illustrates this problem.

The wall 202 of the building 204 in the image can be thought of as lying one a plane, referred to herein as a perspective plane, that is at an angle to the plane of the image. The perspective plane has two vanishing points. One vanishing point is to the right of the image at the point where the lines of the siding would meet if extended. The other vanishing point is above the image at the point where the lines at the corners of the wall would meet if extended.

Figure 2A:
FIG. 2A shows an image including a region with perspective.

The wall 202 includes a number of windows. The windows on the actual building are rectangular and have identical dimensions. However, in the image, the windows have different sizes and have no parallel lines. In FIG. 2A, the user has selected a window 206 with the selection tool and moved a copy 208 of the window to another area on the wall. Due to the perspective of the wall, the copied window appears to be floating in space rather than being attached to the wall. To make the copied window 208 realistically appear to be another window on the wall, the user would typically need to manually shrink the window to make it appear further down the wall and warp the shape to make each edge that images a horizontal or vertical structure align with a corresponding one of the vanishing points.

The application 30 provides a perspective editing tool for performing edits in regions of an image having perspective. The perspective editing tool enables the user to perform various editing operations while preserving the perspective of the object in the perspective plane.

Figure 2B:
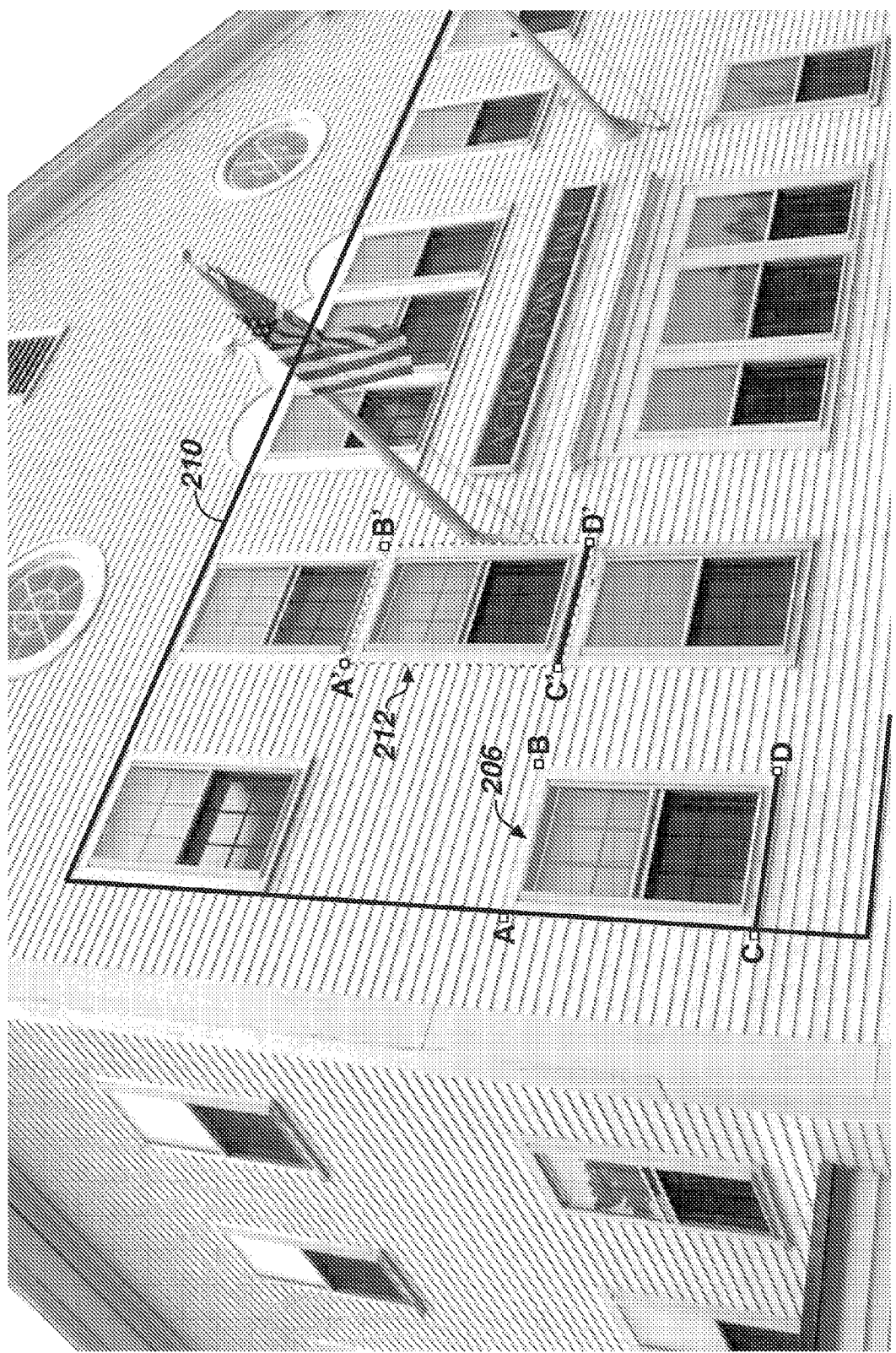
FIG. 2B shows an editing operation performed on the image using a perspective editing tool.
Figure 3:
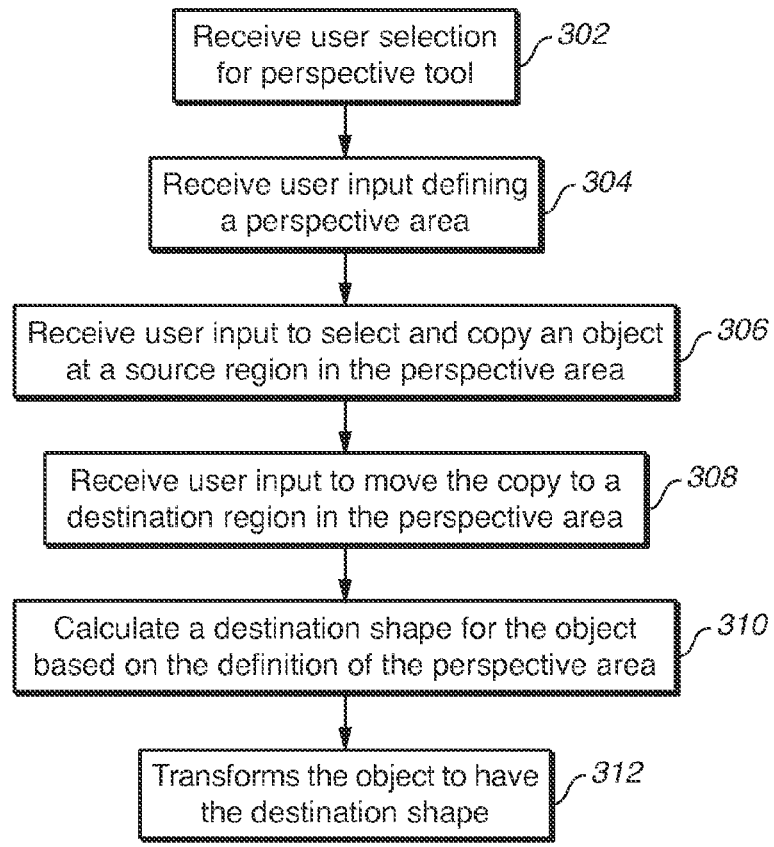
FIG. 3 is a flowchart describing a perspective editing operation.

FIG. 3 is a flowchart describing a perspective editing operation, which is illustrated graphically in FIG. 4. A user editing a 2-D image selects the perspective editing tool (step 302). The user also defines a perspective area (step 304). This can be done by selecting four points that form a quadrilateral that represents a projected rectangle on the desired perspective plane. For example in FIG. 2B, the user selects the points ABCD at the four corners of the window 206. The rays AB and CD define one vanishing point (VPA) for the perspective plane of the wall, and the rays AC and BD define the other vanishing point (VPB) for the perspective plane. At this point, the perspective area is defined by the four points ABCD. The user can then expand the perspective area (shown as lines 210) to cover a larger region of the wall, which can be of any shape, and can be made up of pieces that are not connected to each other.

The user selects and copies an object (window 206) from a source location in the perspective area with a marquee tool (step 306) and moves the copy 212 to another (destination) region of the wall (step 308). The application calculates a destination shape for the object based on the definition of the perspective area (step 310) and transforms the object to have the destination shape (step 312). As a result, the copied object is automatically warped to preserve the perspective defined for the perspective area. In particular, rays formed by A'B' and C'D' along the sides of the copied window point to VPA and the rays formed by A'C' and B'D' point to VPB.

Figure 4A:
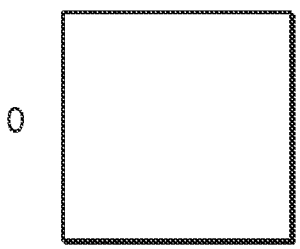
FIG. 4A shows a plane with no vanishing points.
Figure 4B:
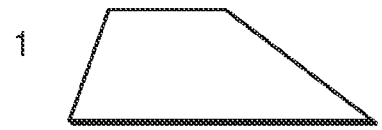
FIGS. 4B and 4C show planes with one vanishing point.
Figure 4C:
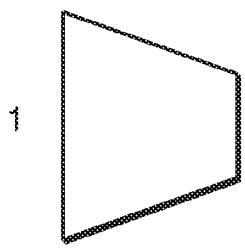
Figure 4D:
FIG. 4D shows a plane with two vanishing points.

In the example shown in FIGS. 2A and 2B, the perspective plane of the wall had two vanishing points. However, as shown in FIGS. 4A-4D, a plane can have zero, one, or two vanishing points, depending on its orientation to the image plane. For the zero vanishing point case shown in FIG. 4, the plane is parallel to the image plane and will not exhibit perspective distortion. The planes shown in FIG. 4B-4D are perspective planes with one (4B and 4C) or two (FIG. 4D) vanishing points.

In another implementation, the user can define the perspective area by identifying a pair of lines for each vanishing point or by otherwise defining two vanishing points for the perspective area. Alternatively, image processing techniques can be employed to automatically identify potential perspective planes, e.g., by identifying elements that appear to be corners or the presence of generally parallel but converging features in different regions in the image. Also, in some special cases, a plane may be defined by one vanishing point, e.g., an image with railroad tracks receding into the distance at one point.

Figure 5:
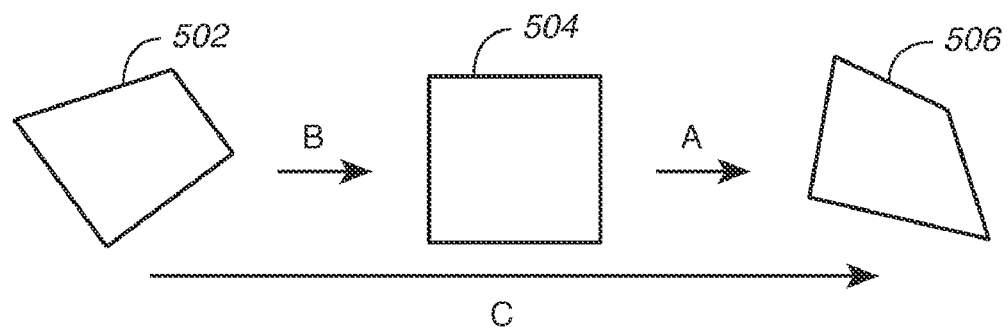
FIG. 5 illustrates a transform from a perspective area to a unit square and back to the perspective area.

The transformation of the copied object to the destination shape can be performed using a two phase transformation technique. As shown in FIG. 5, the application uses the user input points defining the quadrilateral 502 in the perspective area to define a mapping from the quadrilateral 502 to a unit square 504 and back to the quadrilateral or to another quadrilateral 506 representing a different plane.

This process requires a perspective transform of the form $$[x', y', w'] = [u, v, w] \begin{bmatrix} a_{11} & a_{12} & a_{13} \\ a_{21} & a_{22} & a_{23} \\ a_{31} & a_{32} & a_{33} \end{bmatrix}$$

where x' and y' are coordinates in the transformed quadrilateral 506, u and v are coordinates in the unit square 504, and x=x'/w and y=y'/w.

The forward mappings functions are therefore $$x = \frac{x'}{w'} = \frac{a_{11}u + a_{21}v + a_{31}}{a_{13}u + a_{23}v + a_{33}}$$

$$y = \frac{y'}{w'} = \frac{a_{12}u + a_{22}v + a_{32}}{a_{13}u + a_{23}v + a_{33}}$$

The inverse projective mapping for transformation matrix T is $$T^{-1} = \text{adjoint}(T).$$

The transformation C from quadrilateral 502 to transformed quadrilateral 506 can be broken down into two transformations. Transformation A is from the unit square 504 to the transformed quadrilateral 506. The values for the transformation matrix for transformation A are given by:

$(0,0) \rightarrow (x_0, y_0)$ $(0,1) \rightarrow (x_1, y_1)$ $(1,0) \rightarrow (x_2, y_2)$ $(1,1) \rightarrow (x_3, y_3)$ $x_0 = a_{31}$ $x_1 = a_{11} + a_{31} - a_{31}x_1$ $x_2 = a_{11} + a_{21} + a_{31} + a_{31}x_2 - a_{23}x_2$ $x_3 = a_{21} + a_{31} - a_{23}x_3$ $y_0 = a_{32}$ $y_1 = a_{12} + a_{32}a_{13}y_1$ $y_2 = a_{12} + a_{22} + a_{32}y_2 - a_{13}y_2 a_{23}y_2$ $y_3 = a_{22} + a_{32} - a_{23}y_3$ which gives $dx_1 = x_1 - x_2 \quad dx_2 = x_3 - x_2 \quad dx_3 = x_0 - x_1 + x_2 - x_3$ $dy_1 = y_1 - y_2 \quad dy_2 = y_3 - y_2 \quad dy_3 = y_0 - y_1 + y_2 - y_3$ and finally $a_{11} = x_1 - x_0 + a_{13}x_1$ $a_{21} = x_2 - x_1 + a_{23}x_3$ $a_{31} = x_0$ $a_{12} = y_1 - y_0 + a_{13}y_1$ $a_{22} = y_2 - y_1 + a_{23}y_3$ $a_{32} = y_0$ $a_{13} = \begin{vmatrix} dx_3 & dx_2 \\ dy_3 & dy_2 \end{vmatrix}$ $a_{13} = \begin{vmatrix} dx_3 & dx_2 \\ dy_3 & dy_2 \end{vmatrix} / \begin{vmatrix} dx_1 & dx_2 \\ dy_1 & dy_2 \end{vmatrix}$ The transformation matrix for transformation B is the inverse of the transformation matrix for transformation A, and the transformation matrix for the transformation C is the matrix of matrix A and matrix B.

Figure 6:
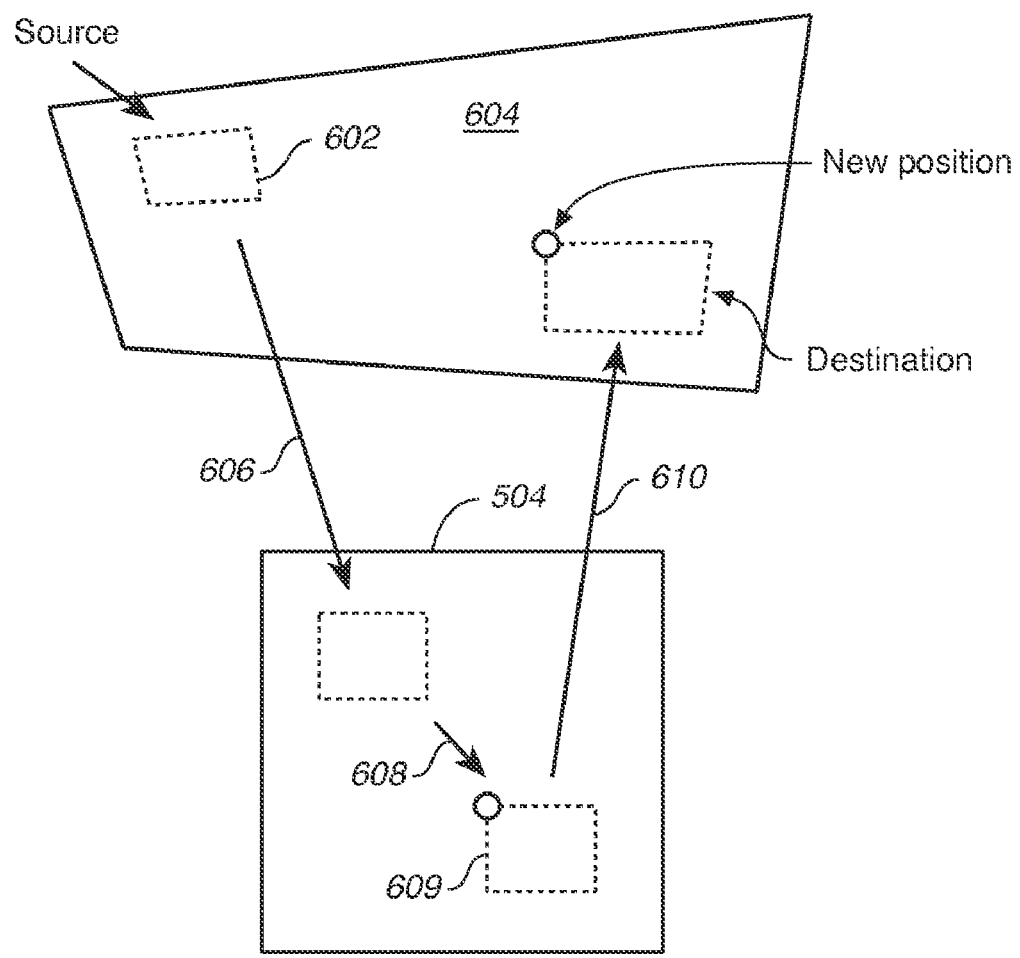
FIG. 6 illustrates using transformations to moved an area from a source in a perspective area to a destination in the perspective area.

These calculations can be used to transform any point from a perspective area to the unit square and back. As shown in FIG. 6, moving an area 602 on a perspective area 604 involves mapping 606 to the unit square 504, performing an offset movement 608 in the unit square to a new location based on a transformed destination position 609, and a remapping 610 back to the plane.

Figure 7:
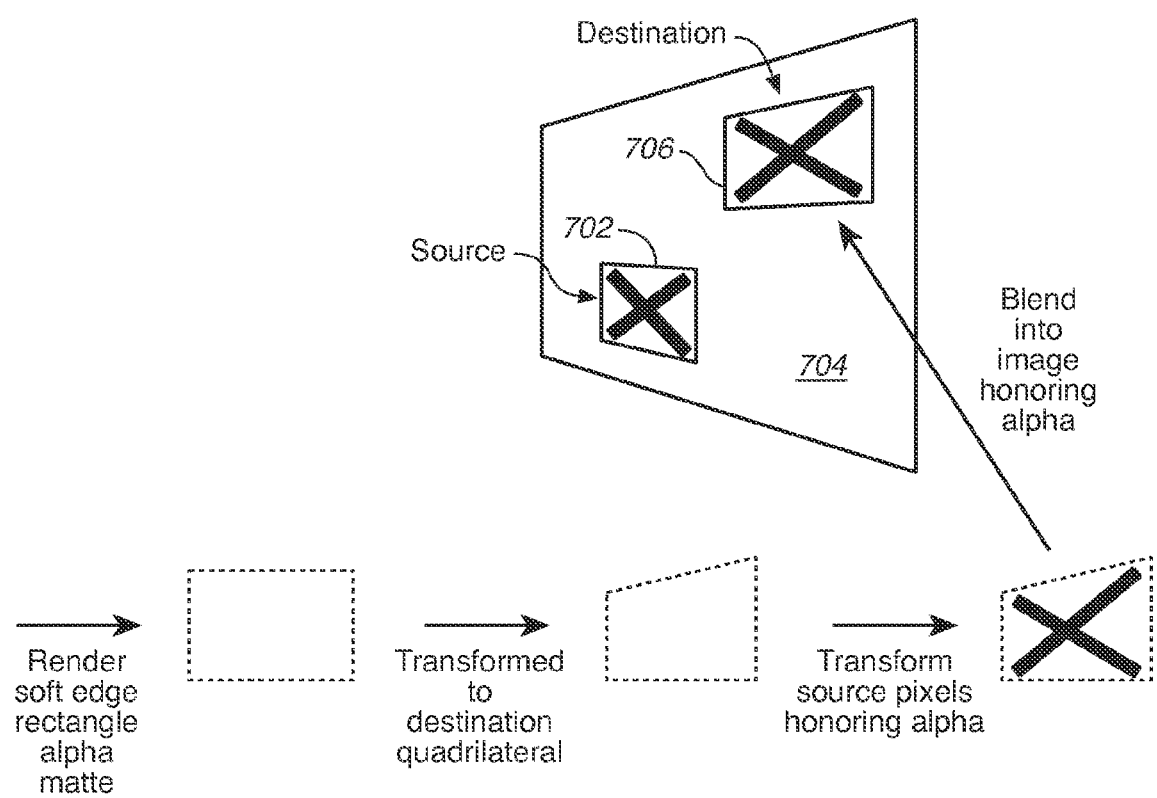
FIG. 7 illustrates a transformation of pixels from a source in a perspective area to a destination in the perspective area.

The process of copying a source object to a destination area on a plane involves walking the destination area and selecting a source pixel for each new destination pixel by applying the transformation matrix forward mapping functions described above. FIG. 7 illustrates a transformation of pixels from a source 702 in the perspective plane 704 to a destination 706 in the area. The application creates a rectangular alpha matte of the appropriate size for the destination, fills the matte with a solid rectangle and optionally applies a Gaussian blur to soften the edge by a desired feather amount 702. This matte is then transformed to the destination location 706. The process that transforms the source pixels to the destination can be enhanced to check the destination pixels alpha value and only transform pixels that are not transparent.

Transforming pixels directly into the destination location does not provide a means for the common undo operation and also uses the images alpha channel in a way that might undermine its primary use. To provide for this, a separate bitmap is allocated that is the size of the minimum enclosing rectangle of the destination area. The above operations are performed using this intermediate bitmap as the destination. The result is then blended into the final destination location on the image, with the alpha left unmodified. If the destination area is saved to an undo bitmap prior to the edit, then it can be used for an undo operation, and the intermediate bitmap that was used in process can be stored for a redo.

To maintain the scale of an object as it is transformed from the perspective area to the unit square and back, the aspect ratio of the perspective area must be determined. With knowledge of the aspect ratio of the source and destination perspective areas, the scale of the object can be maintained when it is moved along the plane, resized, rotated, or transferred to another perspective area.

Figure 8:
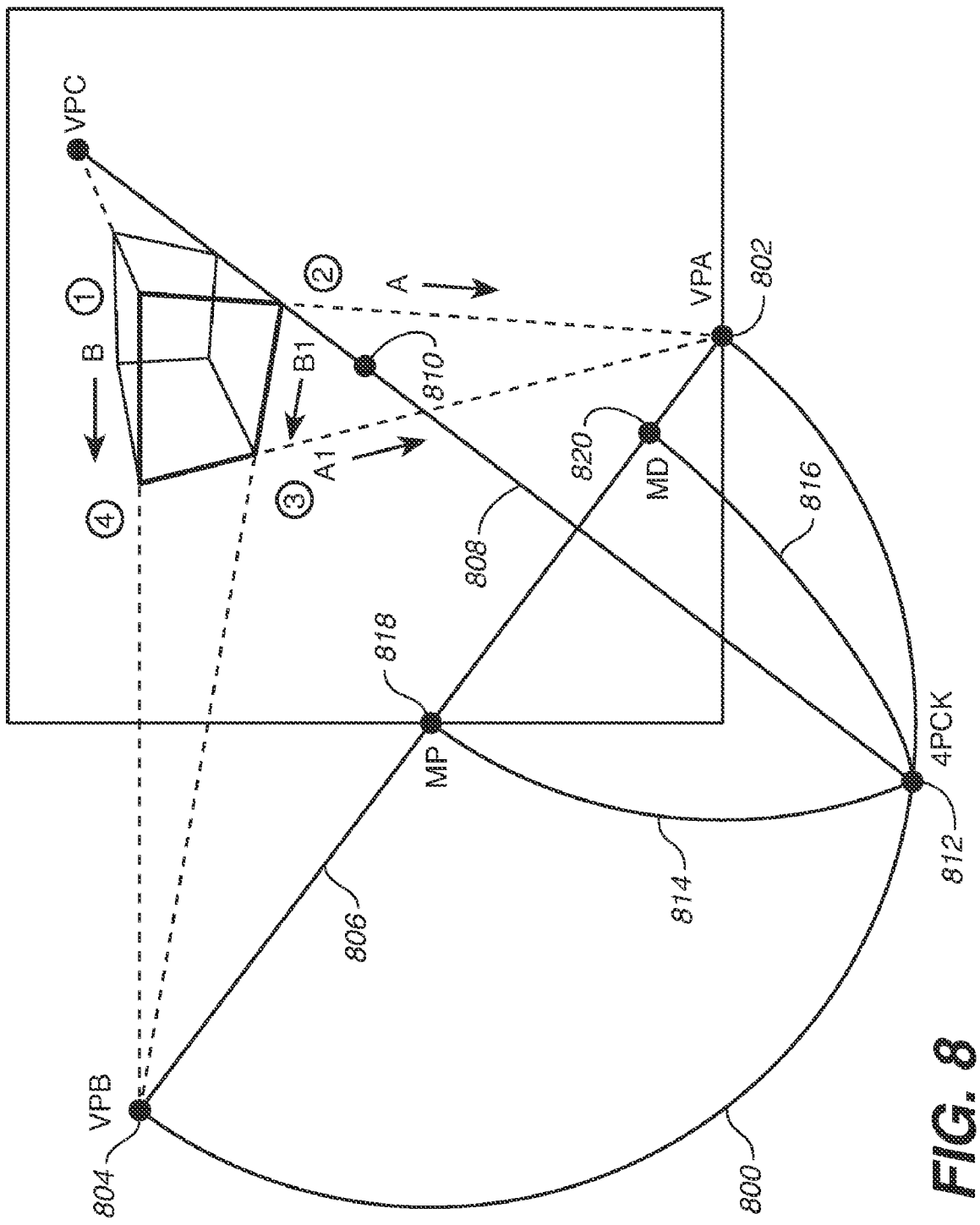
FIGS. 8-10 illustrate a technique for identifying an aspect ratio for a perspective area.

The aspect ratio of the width and length of the perspective area can be determined using a measure bar. The measure bar is used to project regular measurements onto the defined surface. Measure points corresponding to the measure bar can be located by calculating circle 800 around the vanishing points VPA 802 and VPB 804 and a vanishing line 806 between VPA and VPB, as shown in FIG. 8. A line 808 perpendicular to the vanishing line and intersecting the center of projection 810 is calculated. Where this line intercepts the circle is the apex 812. Radii defined by the two vanishing points and the apex are rotated to form arc 814, 816. Where these arcs intercept the vanishing line 806 are the measure points 818, 820.

Figure 9:
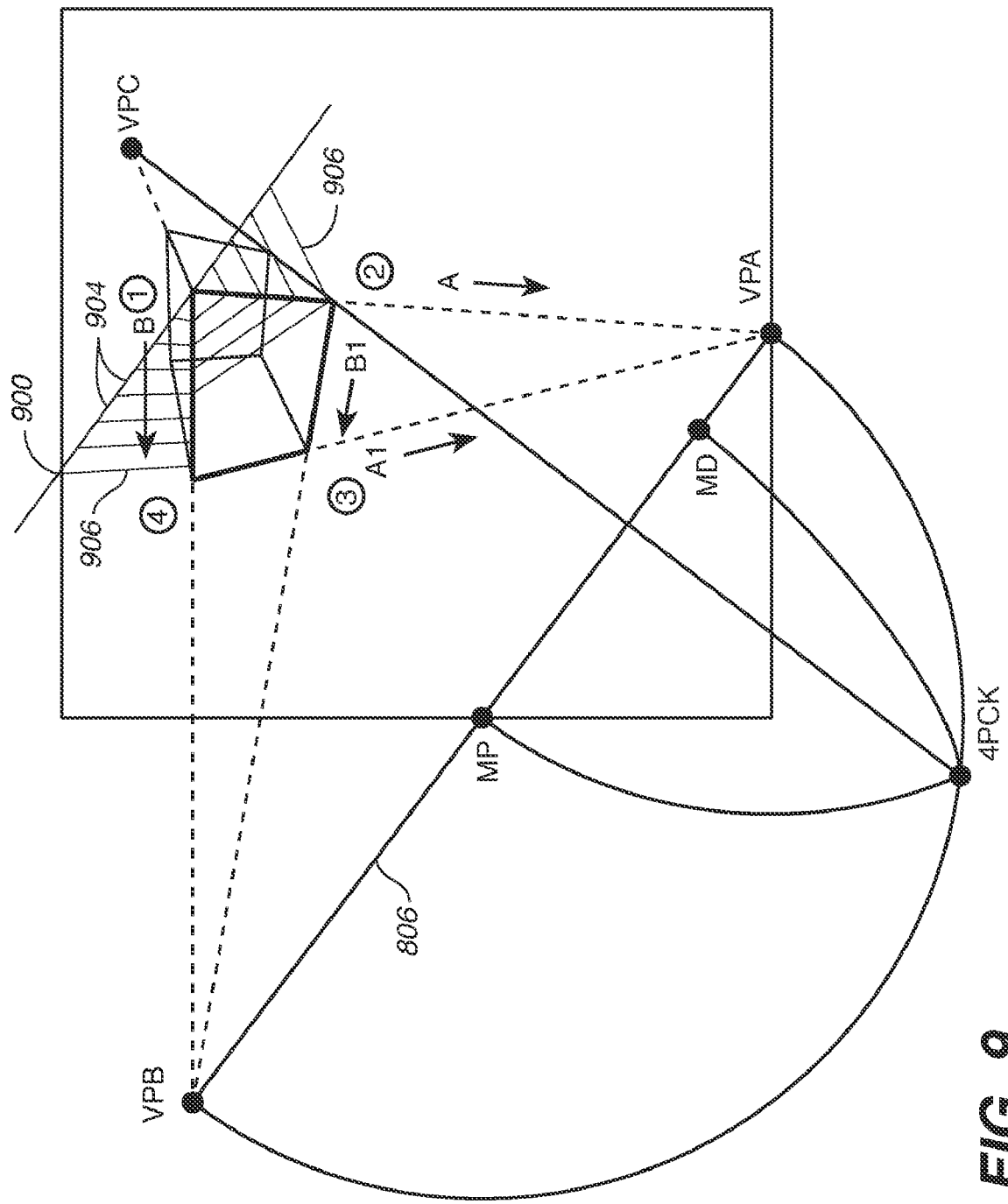
Figure 10:
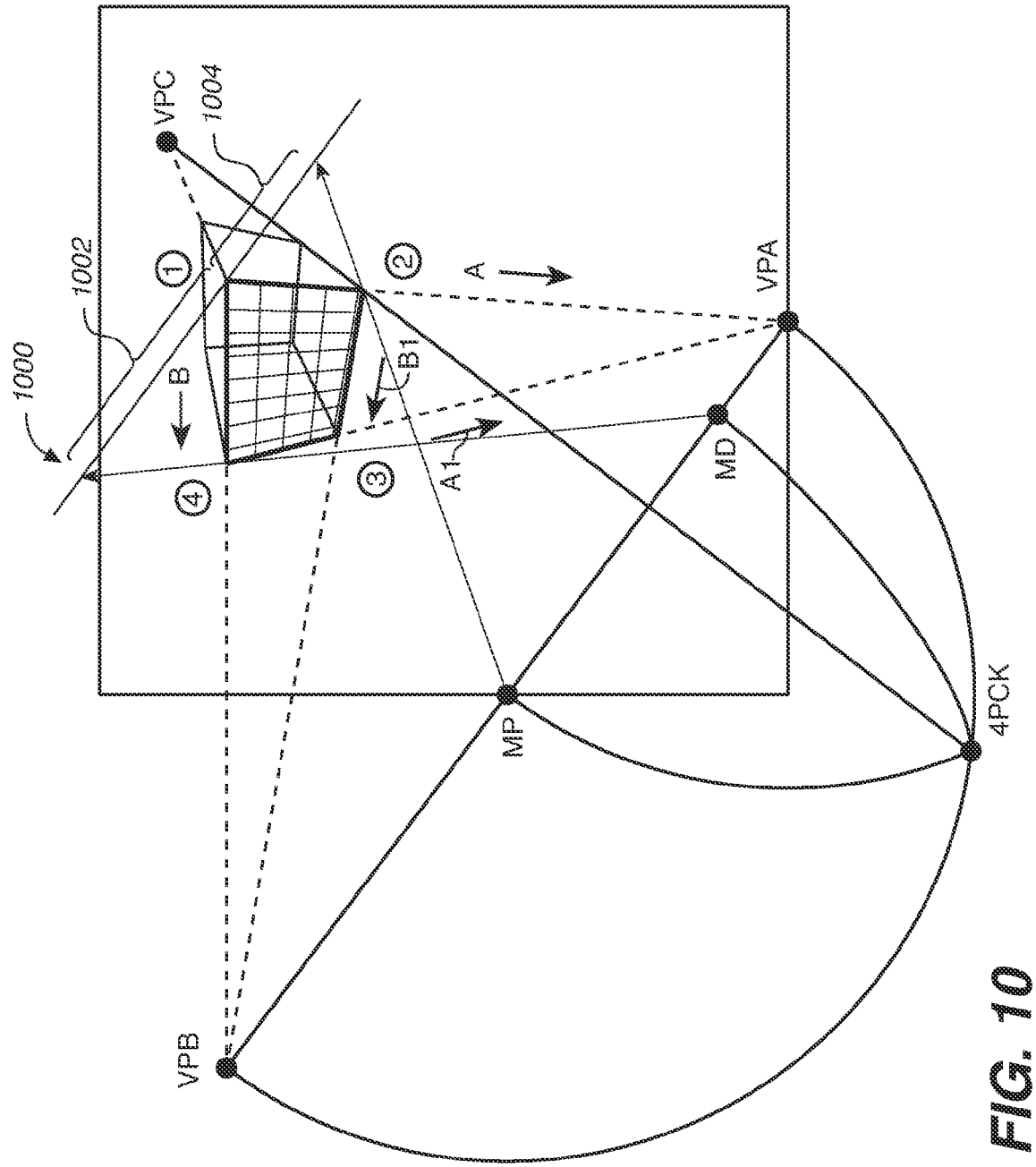

A line 900 parallel to the vanishing line 806 is placed at the shared origin 902 of the two outside edges of the perspective area. The measure bars intervals 904 are transferred onto the surface using the measure points. Rays 906 are from the line 900 are calculated at even intervals to the measure points, as shown in FIG. 9. The measure bar 1000 is shown in FIG. 10 in two sections 1002, 1004. The aspect ratio is the ratio of the lengths of these two sections. A grid that represents an orthogonal grid can be created by calculating rays from the intersections of the rays at the edges to the vanishing points. The aspect ratio factored into the transformations from the perspective area to the unit square and back to the perspective area. In this manner, transformations are to an aspect ratio corrected square.

Figure 11A:
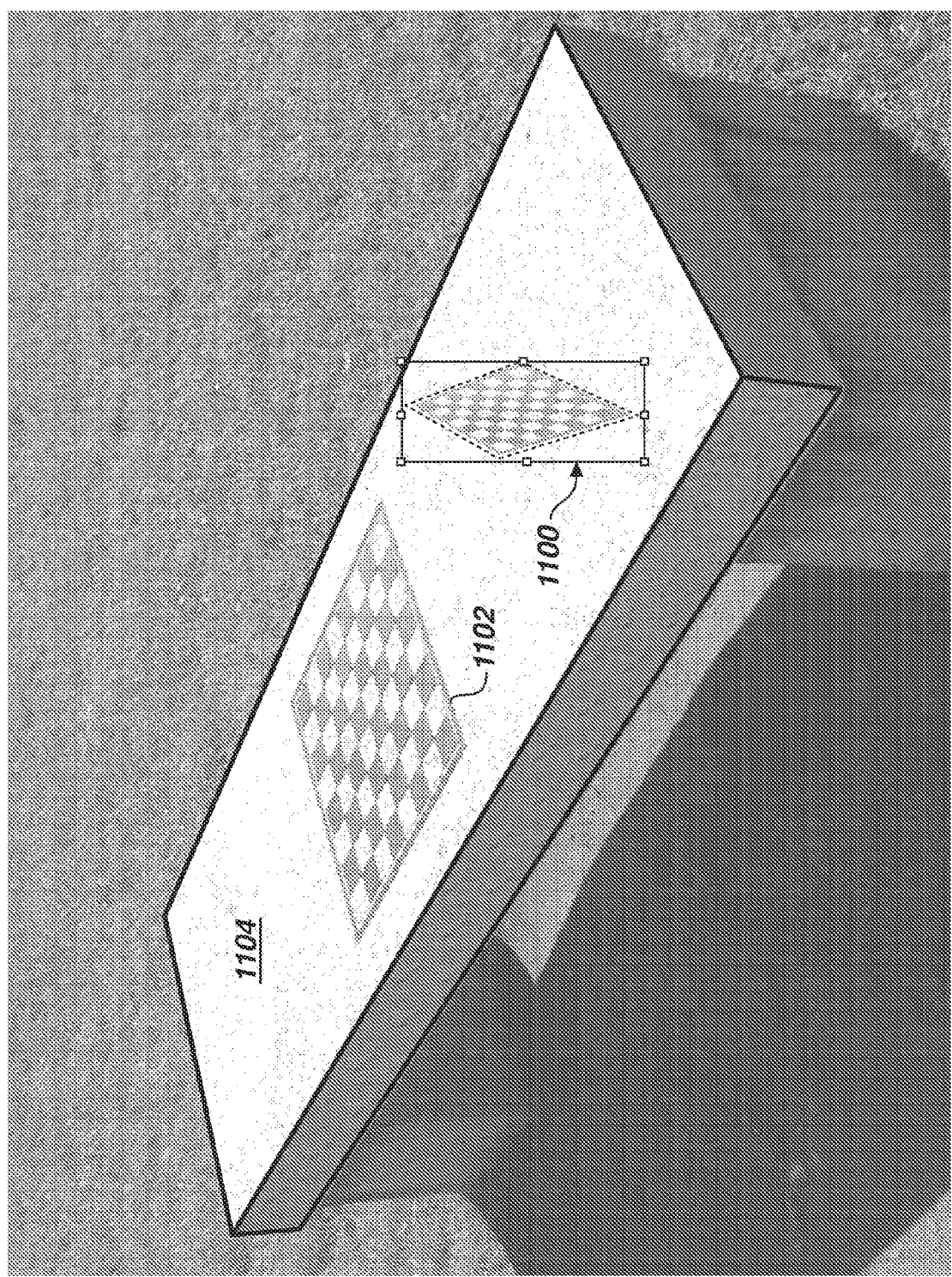
FIGS. 11A and 11B show a rotation operation in a perspective area with and without accounting for the aspect ratio of the perspective area, respectively.
Figure 11B:
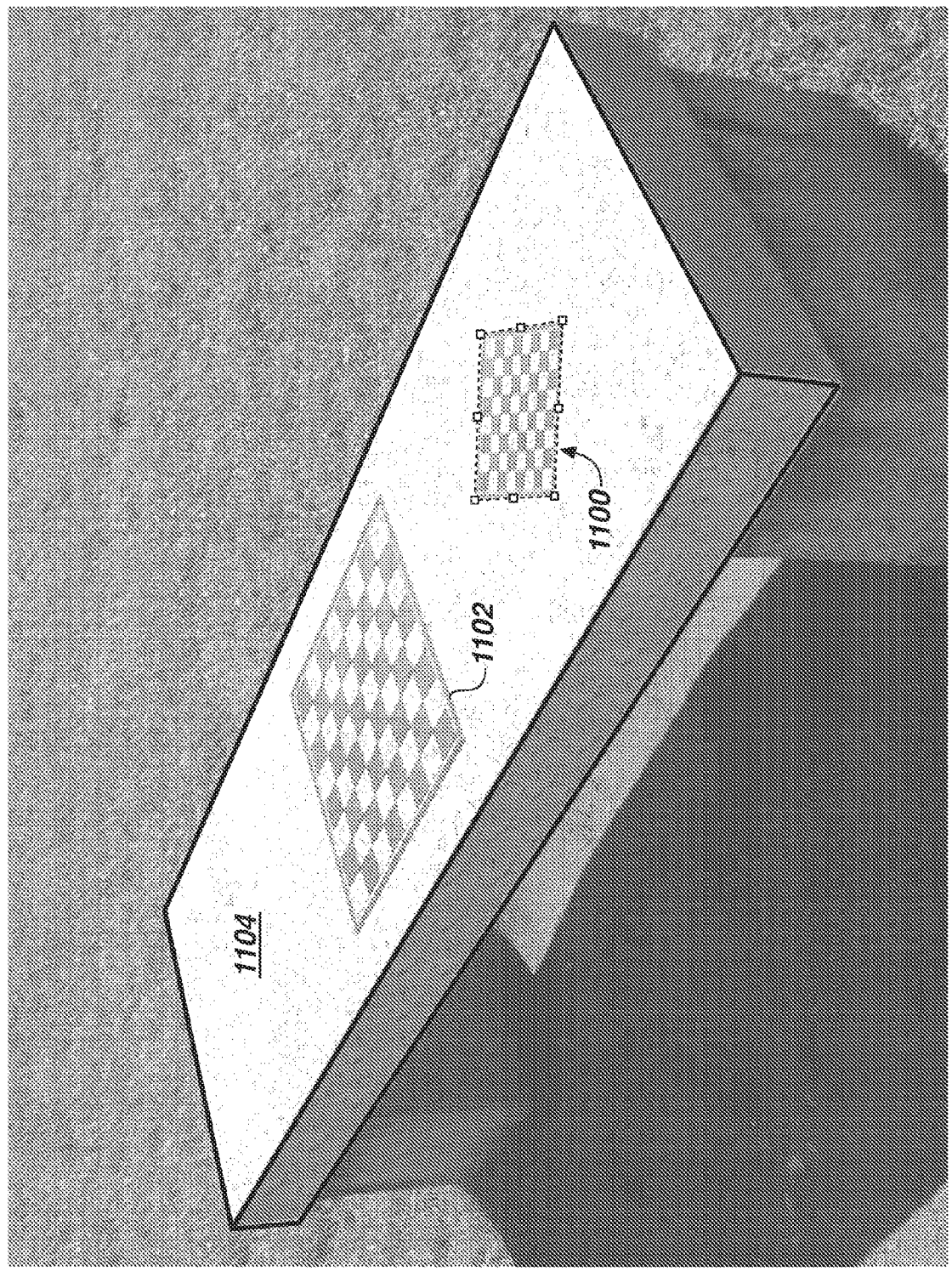

The aspect ratio provides information that is used to correct distortion problems that can occur when transforming to and from the unit square. For example, as shown in FIG. 11A, performing a rotation of a copy 1100 of an object 1102 without providing for the aspect ratio can cause undesirable distortions. By factoring in the aspect ratio, a more accurate rendering of the copied object 1100 in the perspective area can be achieved.

Figure 12:
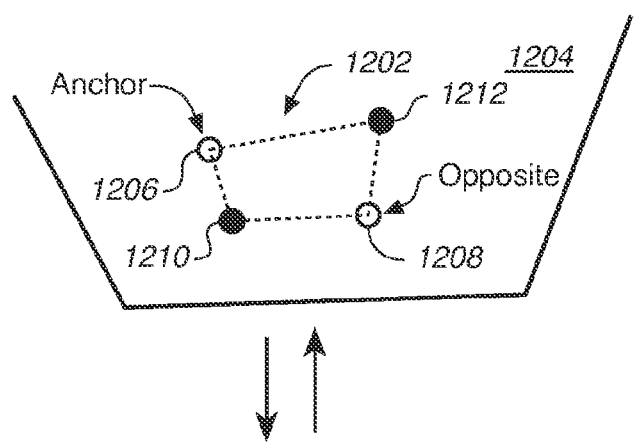
FIG. 12 illustrates using the perspective transformation technique to represent an editing tool in a perspective area.
Figure 12:

The transformation can be used for editing objects as well as for representing the editing tools in the perspective area. FIG. 12 shows a process for creating a rectangular marquee selection 1202 on a perspective area 1204. The anchor point is the start mouse position 1206. The opposite point is the current mouse position 1208. The two other points 1210, 1212 are calculated by transforming the known points to the unit square, calculating the other points in the unit square, and then transforming those points back to the perspective area, creating a quadrilateral that represents a rectangular area on the plane.

Figure 13:
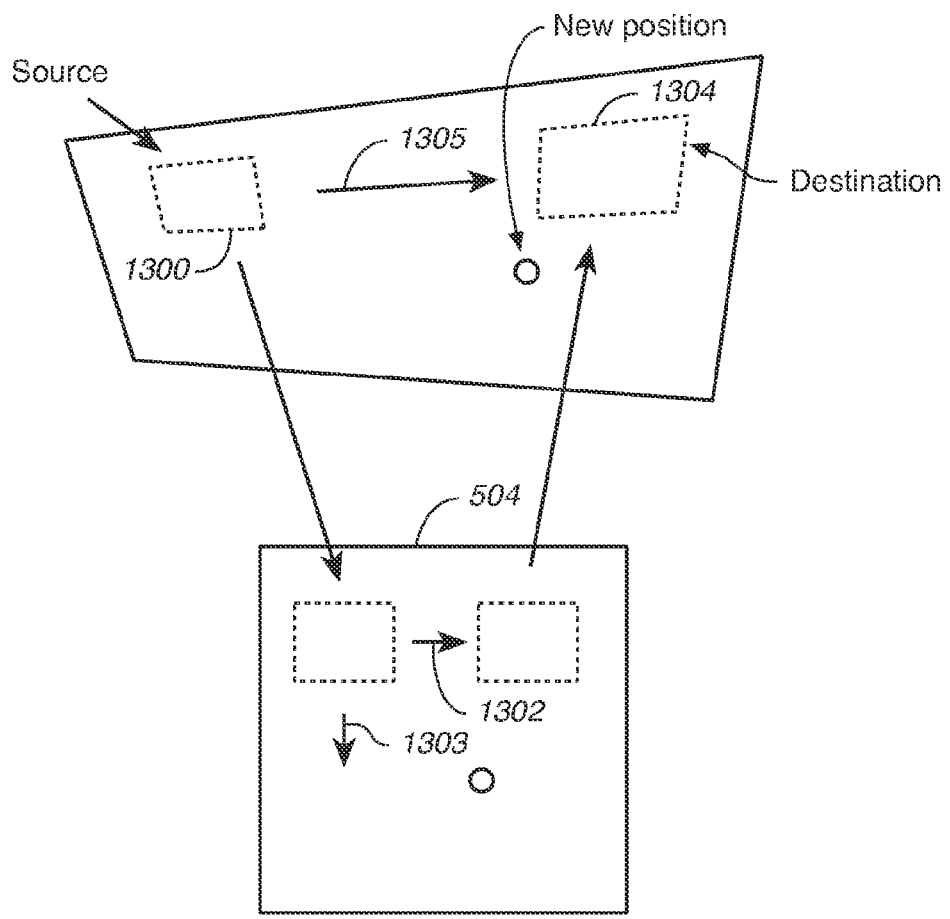
FIG. 13 illustrates using the perspective transformation technique to constrain movement of an object in a perspective area.

In typical image editing applications, editing operations may be constrained in a horizontal or vertical direction, e.g., by pressing the SHIFT key when moving a selected object. As shown in FIG. 13, this may also be performed in a perspective adjusted manner by mapping the source quadrilateral 1300 to the unit square 504 and constraining movement in the unit square to a horizontal line 1302, or alternatively to a vertical line 1303. The result is that the movement of the transformed destination quadrilateral 1304 is constrained in the perspective area in a way that coincides with the perspective of the plane, i.e., along a ray 1305 pointing to a vanishing point defining the plane.

Figure 14A:
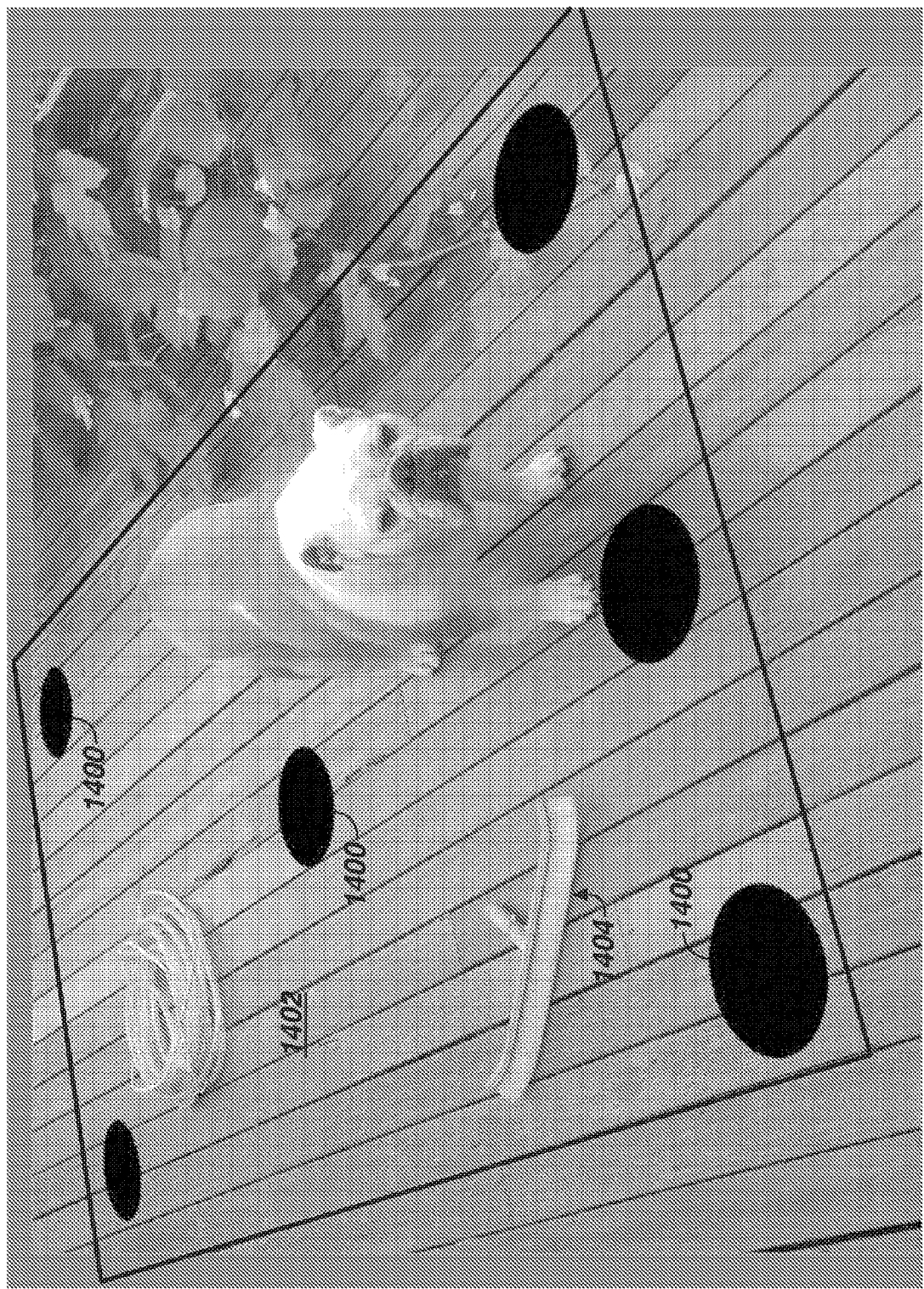
FIGS. 14A-14C illustrate the user of the perspective transformation technique to represent brush tools in a perspective area.
Figure 14B:
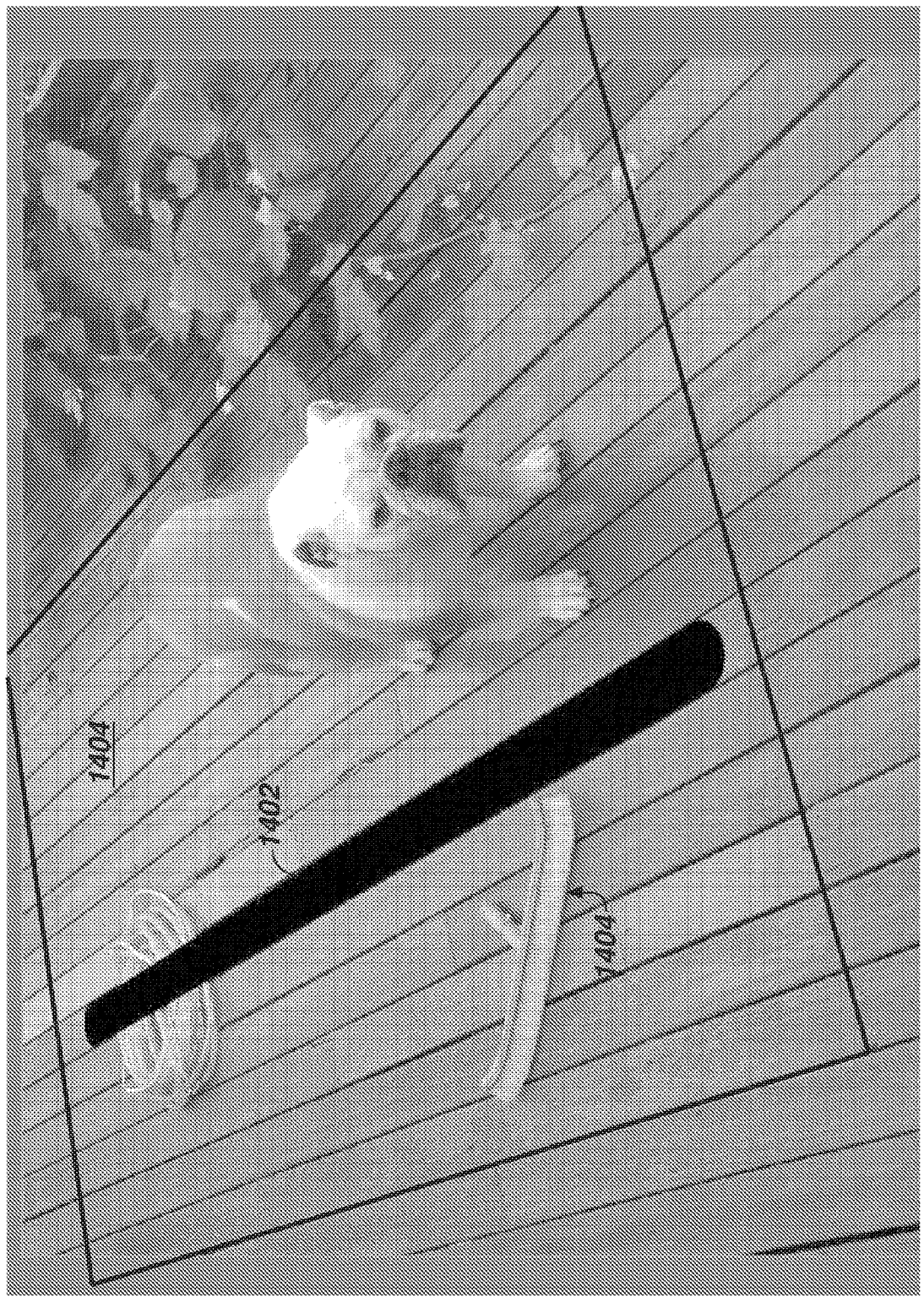
Figure 14C:

The perspective transformation technique can be applied to define the shape, size, orientation, or some combination of them, of editing tools such as a paint brush and a clone brush. The brush shape is created in the same way that the marquee shape was created in FIG. 12 except a filled circle is calculated in the alpha building matte. This technique can be applied to any brush shape or type. The size of the brush will change as it moves over the plane through the process of transforming to the unit square, moving in the unit square, and then transforming back to the plane. As shown in FIGS. 14A and 14B, the size and shape of a circular paint brush 1400 is transformed to preserve the perspective on the perspective area of the deck 1402. FIG. 14C illustrates the use of the clone brush to erase the pool brush 1404 in which the background area selected for the erasing operation maintains the perspective of the deck 1402. The perspective transformation technique can also be applied to other tools that apply effects to objects, e.g., a blur tool for blurring the edges of an object. These effects tools can change an attribute of pixels in or near the object, such as transparency. The area effected by the tool will depend on the size and shape of the tool as determined by the transformation of the perspective area in which the tool is displayed.

Figure 15A:
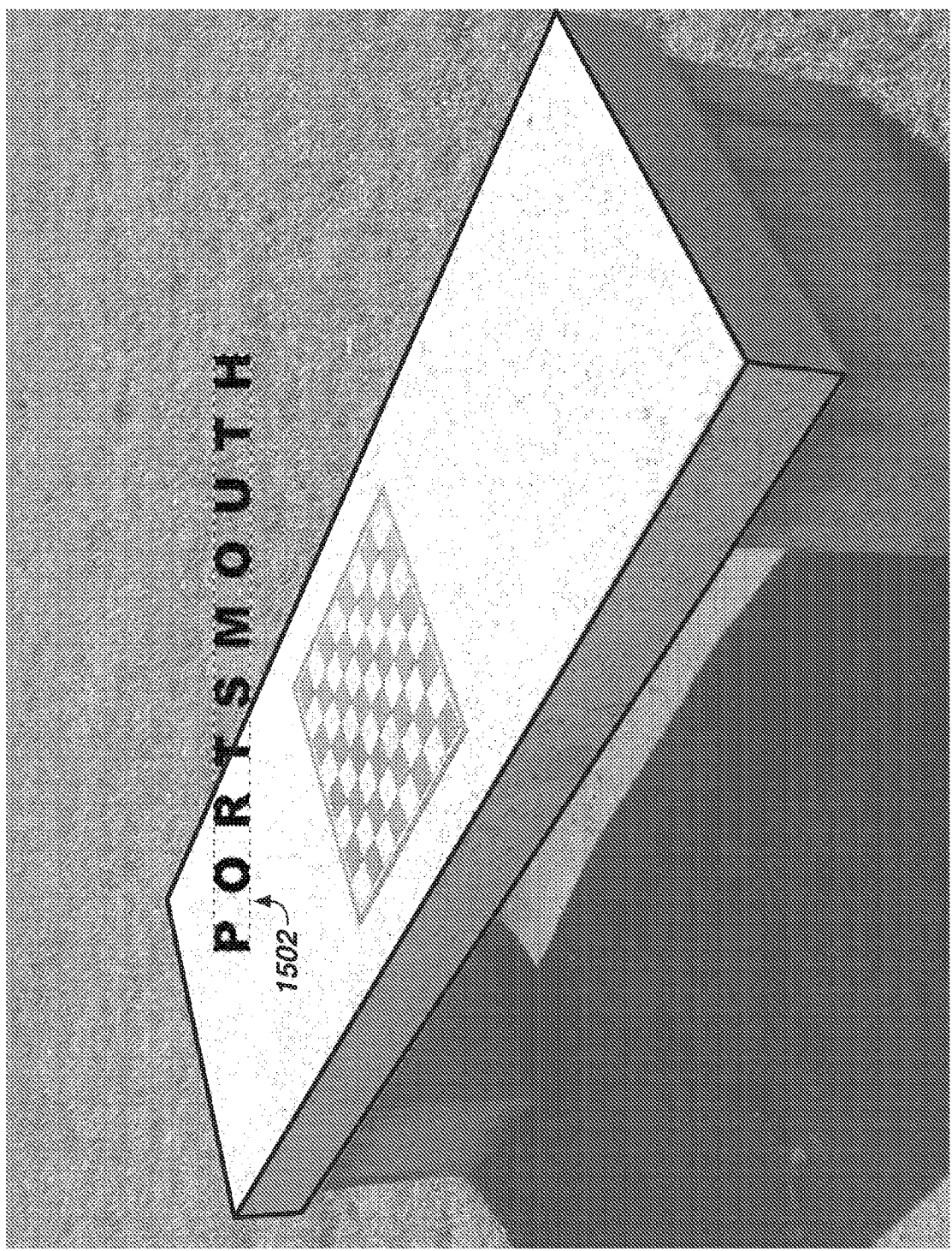
FIGS. 15A-15B illustrate copying an object from outside of a perspective area into a perspective area.
Figure 15B:
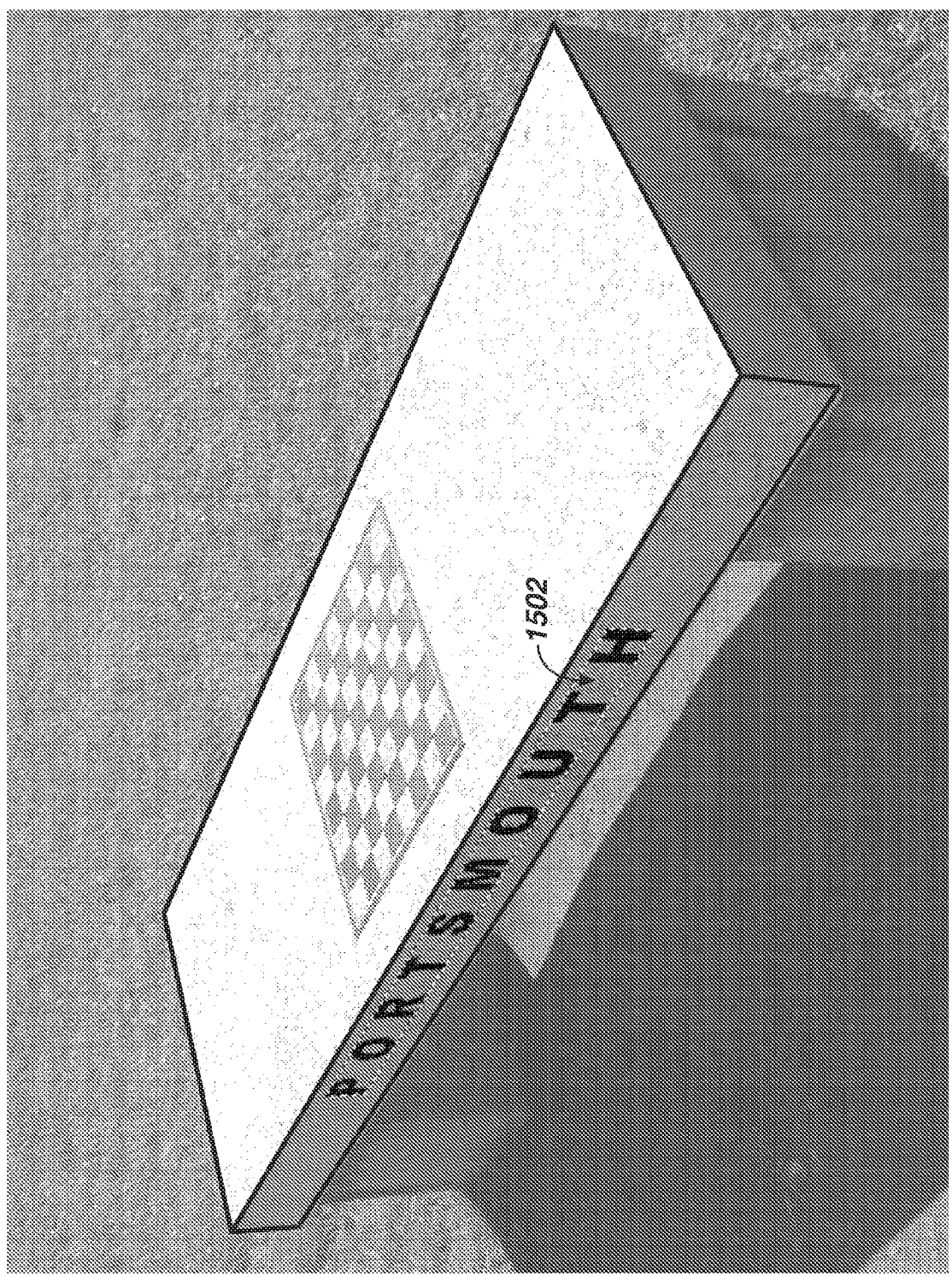

The user can also copy objects from outside the perspective area(s) in the image into a perspective area. The object may be selected from the image or from another image. In FIG. 15A, the object 1502 lies outside the perspective area 1504 on the bench. As shown in FIG. 15B, when the user moves the object 1502 into the perspective area 1504, the application directly maps the object to the unit square and then performs the transformation from the unit square to the perspective area. Alternatively, the user can copy an object in a perspective area and copy it into a region of the image outside of the perspective area(s) by performing the transformation from the perspective area to the unit square.

The application also enables the user to generate another perspective area based on an already-defined perspective area with a plane tear off tool. The user can then perform editing operations in the destination perspective area as in the source perspective area. Also, editing operations may be performed across the source and destination perspective areas.

Figure 16:
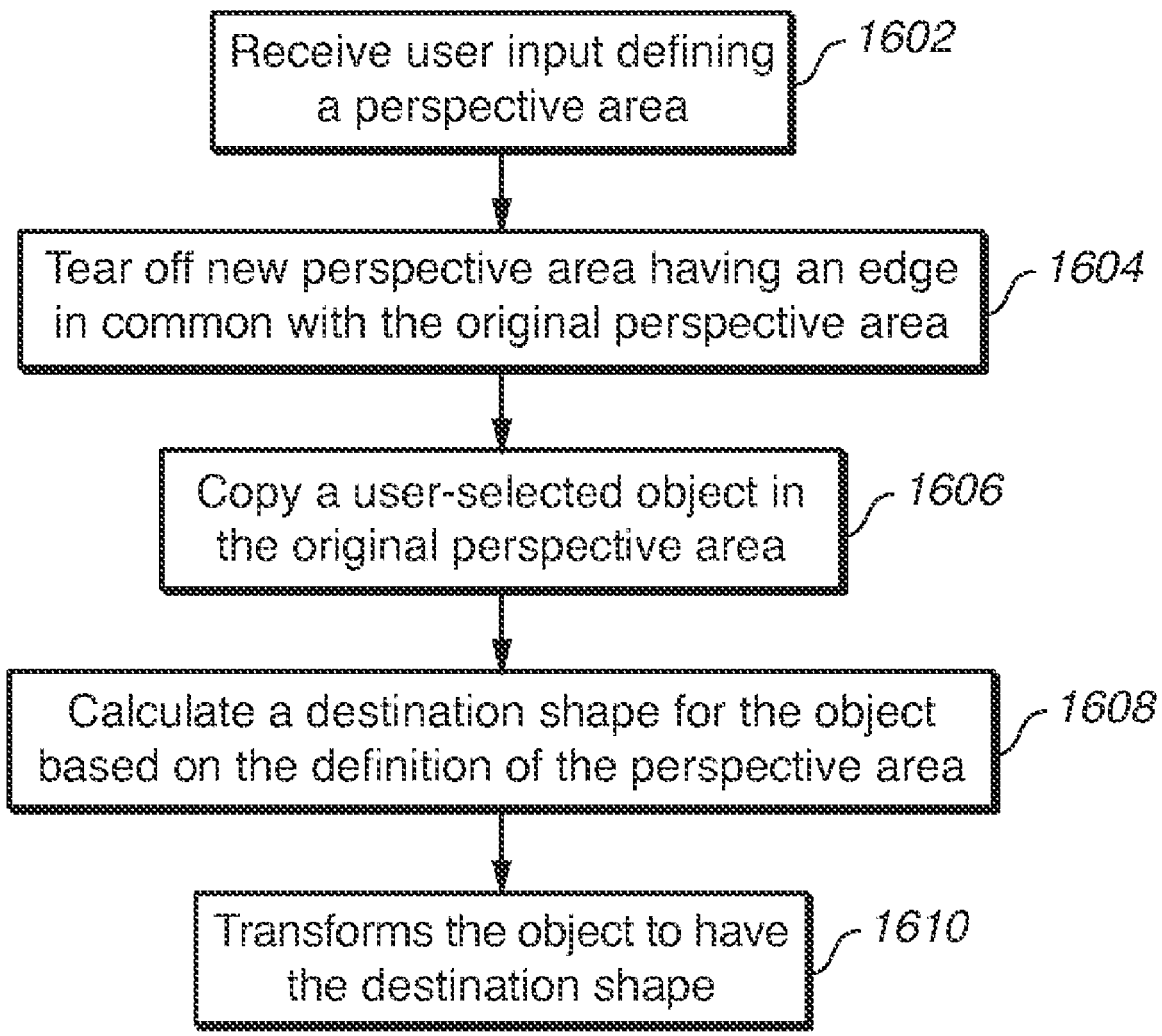
FIG. 16 is a flowchart describing an editing operation across adjacent perspective areas.
Figure 17:
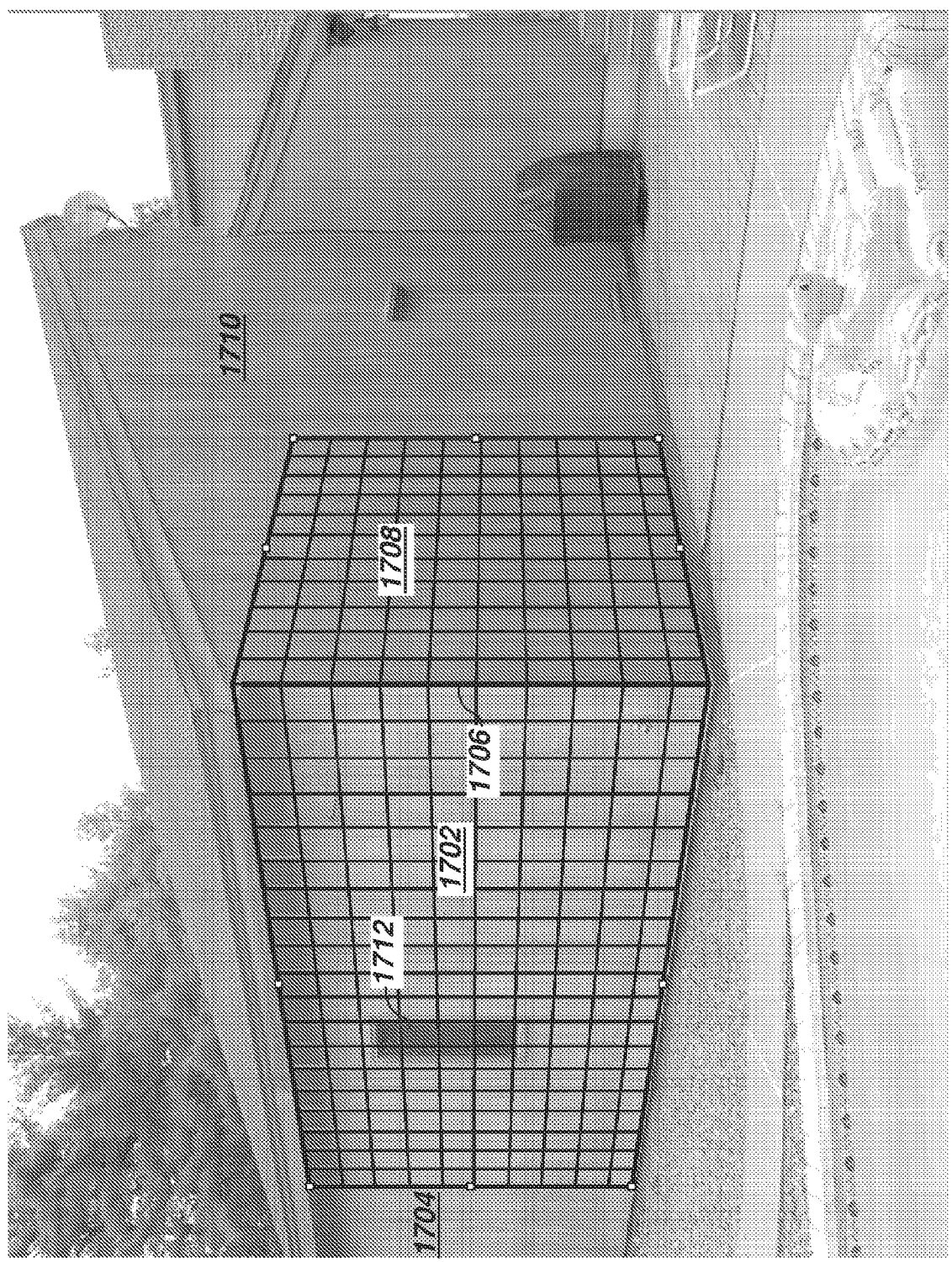
FIG. 17 shows an image with a source perspective area and a destination perspective area generated automatically by the image editing application.

FIG. 16 is a flowchart describing an editing operation utilizing the tear off tool. The user defines a perspective area 1702 on wall 1704 (step 1602). The user then tears off destination perspective area 1708, with common edge 1706, which adheres to wall 1710 (step 1604). The application determines an aspect ratio for the destination perspective area based on the size of the common edge 1706 and other information, as described below.

Figure 18:
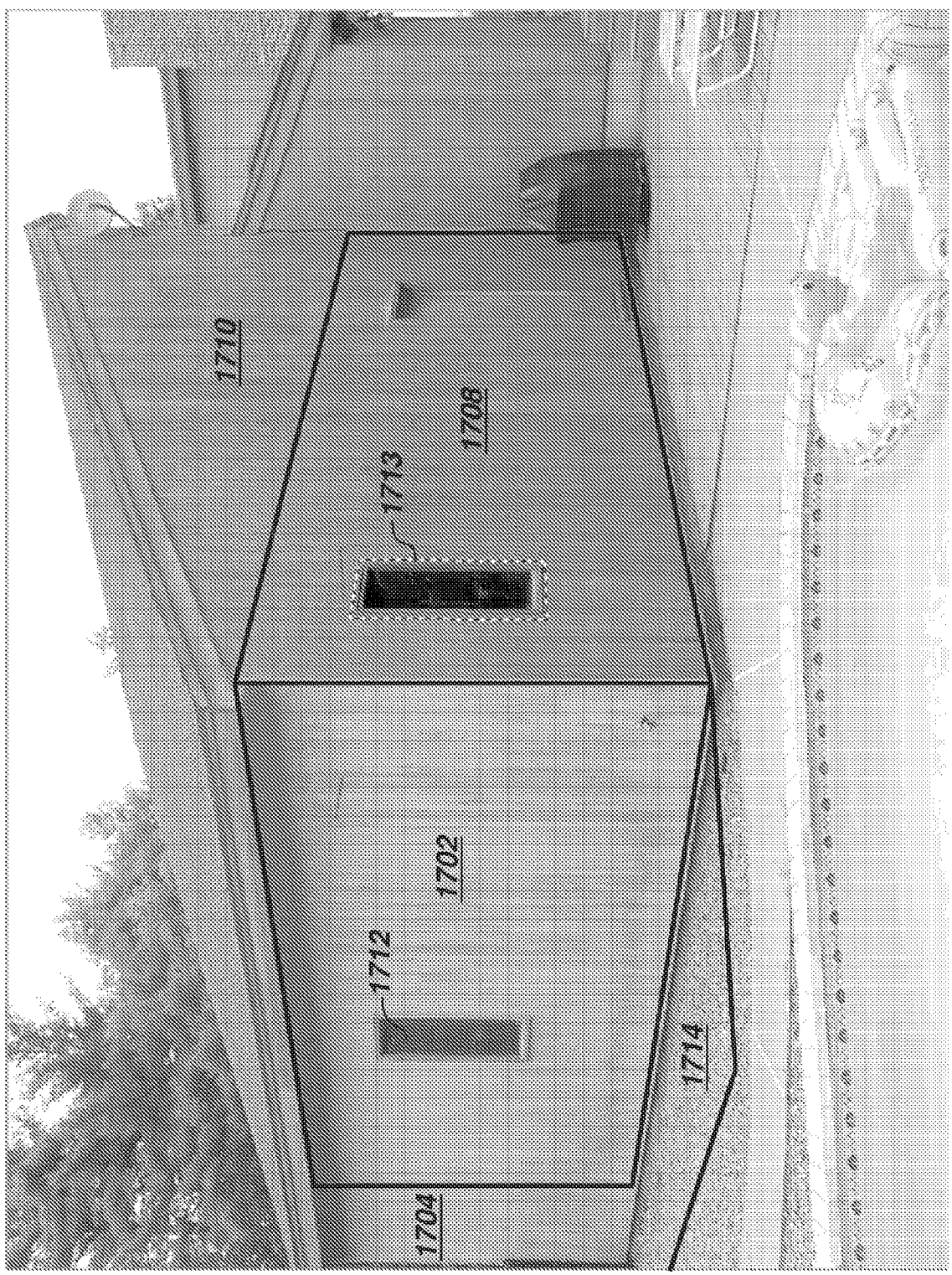
FIG. 18 shows an image with an object copied from a source perspective area to a destination perspective area.

The user can select and copy an object in perspective area, such as the window 1712 (step 1606). The user can move the copied window 1713 along the wall and into to the adjacent perspective area 1708, as shown in FIG. 18. The application then transforms the copied object to the unit square and calculates a destination shape for the object based on the definition of the new perspective area (step 1608). The application then transforms the object to have the destination shape (step 1610). The copied window 1713 appears on the wall 1710 with the proportion and shape that conforms to the perspective of the destination perspective area 1708.

The user can tear off multiple perspective areas, for example, from perspective area 1702 and onto the ground 1714 in front of wall 1704. The user can then perform perspective editing operations across the two perspective areas 1702, 1714, or from the perspective area 1714 to the perspective area 1708. Also, in an implementation, the user can tear off perspective areas that are not perpendicular to the source perspective area, i.e., at any non-zero angle to the source perspective area. The tear off tool can include an angle tool the user can use to define the angle of the new perspective area. Alternatively, the user can edit the torn off perspective area by changing the distant points of the area of the quadrilateral.

Performing editing operations across perspective areas introduces some complexity, and aspects such as relative sizes and orientation of the edited objects become an issue. To address these issues, the perspective area can be defined in a specific way. Instead of storing the points defining the quadrilateral used to define the perspective area as points, the points can be used to calculate rays which are then used to define the perspective area.

Figure 19:
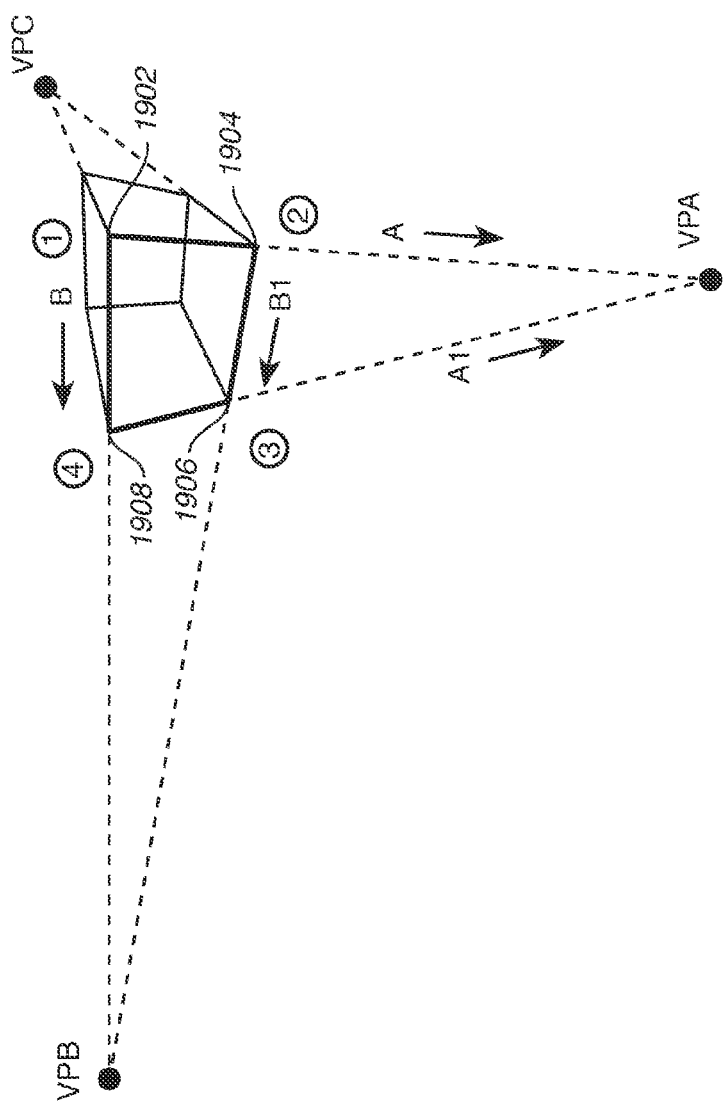
FIG. 19 illustrates a technique for defining a perspective area.

A ray consists of a ray identifier (id), origin, vanishing point id and a cache of the location of the vanishing point id. The ray id marks a ray as A, A1, B or B1, as shown in FIG. 19. Rays A and B are the outside rays, farthest from the vanishing point. Rays A1 and B1 are the inside rays, closest to the vanishing point. The corners of the formed box 1900 can be designated as follows; the origin of A or B is the shared origin (SO) 1902; the origin of ray A1 is A1o 1904; the origin of ray B1 is B1o 1906; and the end point of ray A1 or B1 is the shared terminal (ST) 1908.

Figure 20:
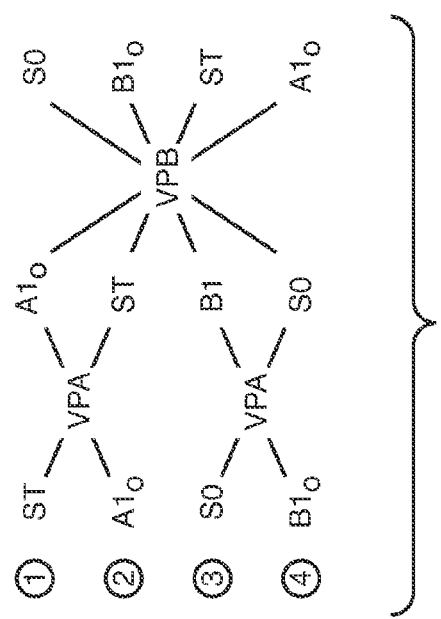
FIG. 20 shows relationships between points in the perspective area.

The method of sorting the points to determine their classification assumes that the four points are wound around the figure, starting at no particular vertex. This constraint is enforced by the user interface (UI). Taking these four wound points, it is assumed that the lines formed by points 1902 and 1904 and 1906 and 1908 point to the same vanishing point. Similarly, it can be assumed that the lines formed by points 1902 and 1908 and 1904 and 1906 point to the other vanishing point. The points are sorted by assuming that 1902 is ST, 1904 is A1o, 1906 is SO and 1908 is B1o. Next, A1o and ST are sorted by distance from VPA, B1o and SO are sorted by distance from VPA, A1o and SO are sorted by distance from VPB, and finally ST and B1o are sorted by distance from VPB. FIG. 20 shows the relationships between these points.

Figure 21:
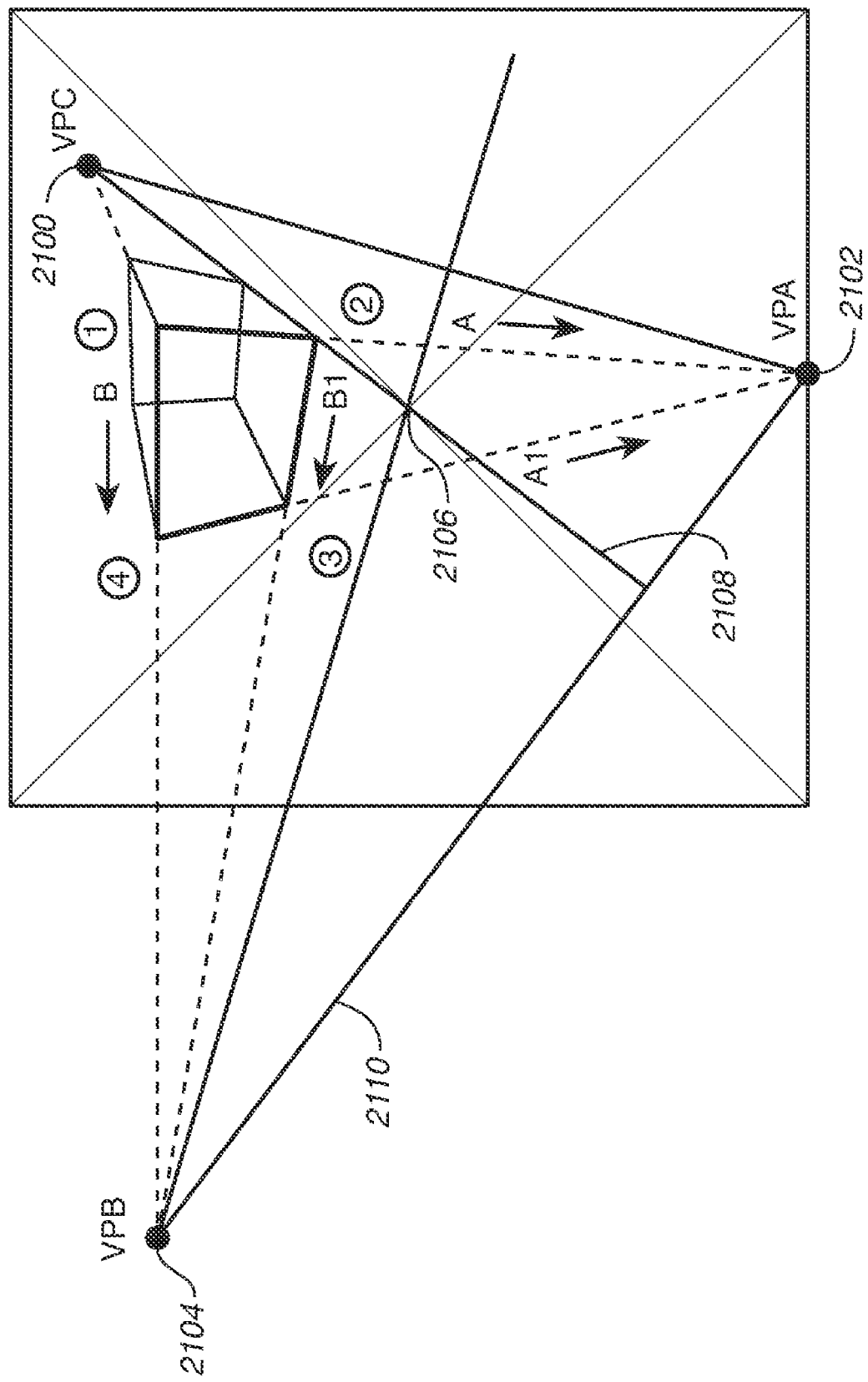
FIGS. 21-24 illustrate a technique for generating a destination perspective area from a source perspective area.

In order to define the new perspective area for a tear off procedure, a third vanishing point must be calculated. As shown in FIG. 21, the third vanishing point (VPC) 2100 can be calculated based on the known locations of VPA 2102 and VPB 2104 defined for the source perspective area and the center of projection 2106 of the image, which is assumed to be the center of the image. In one implementation, the user can define a different center of projection. VPC can be determined by running a line 2108 perpendicular to the line between VPA and VPB (VLAB) 2110 through the center of projection. Another line is run through VPB and the center of projection. The intersection of these two lines is VPC.

Figure 22:
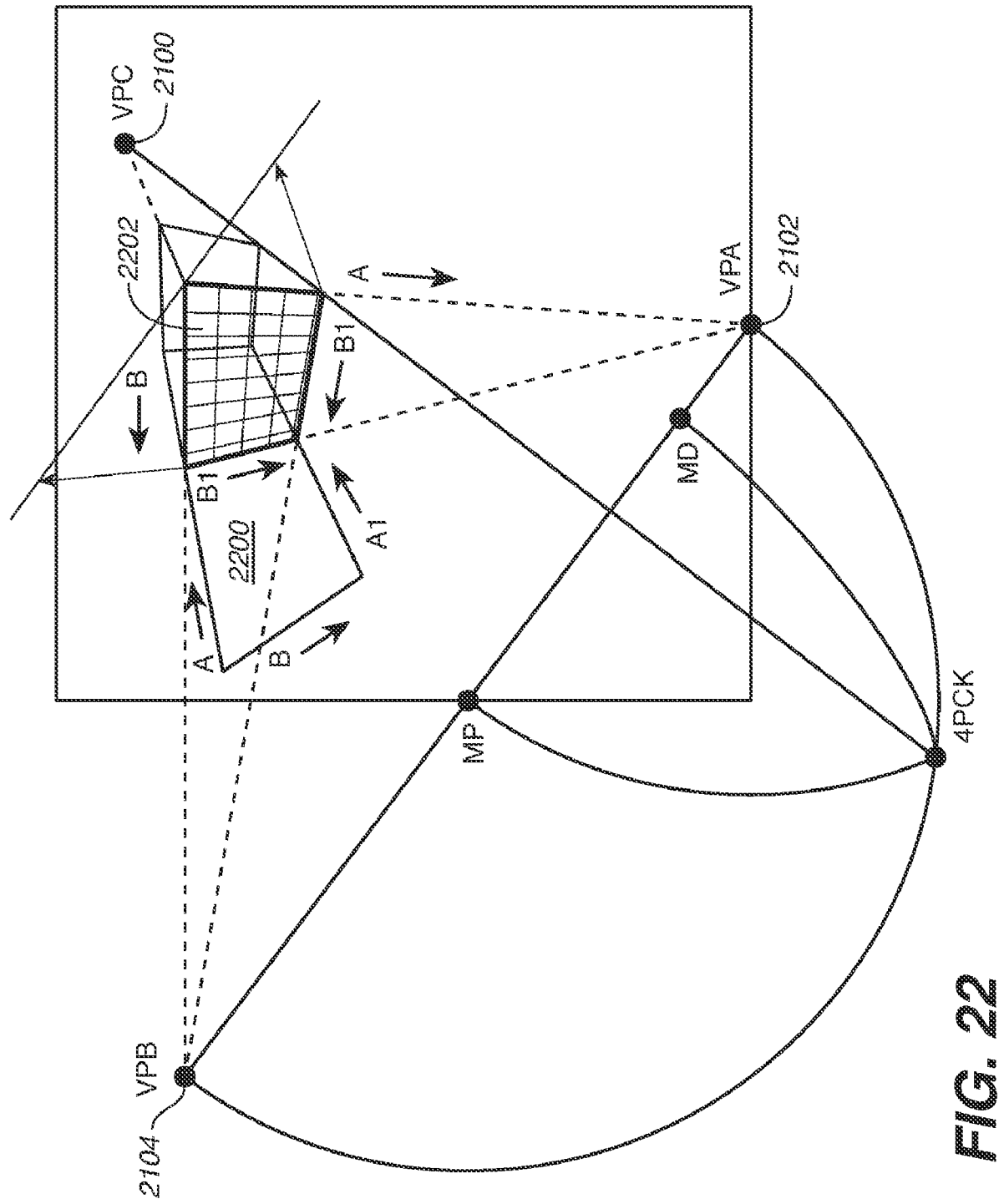

With VPC identified, a perspective area can be generated. The new perspective area 2200 shares an edge with the source perspective area 2202 and has vanishing points at VPC, VPA, as shown in FIG. 22. To maintain the internal surface structure, the torn off perspective area is defined with rays like the source perspective area (FIG. 19). In addition, the rays are alternated so that an A edge of a plane is never against an A edge of another perspective area. This spatial clue is used to handle the orientation problem described below.

Figure 23:
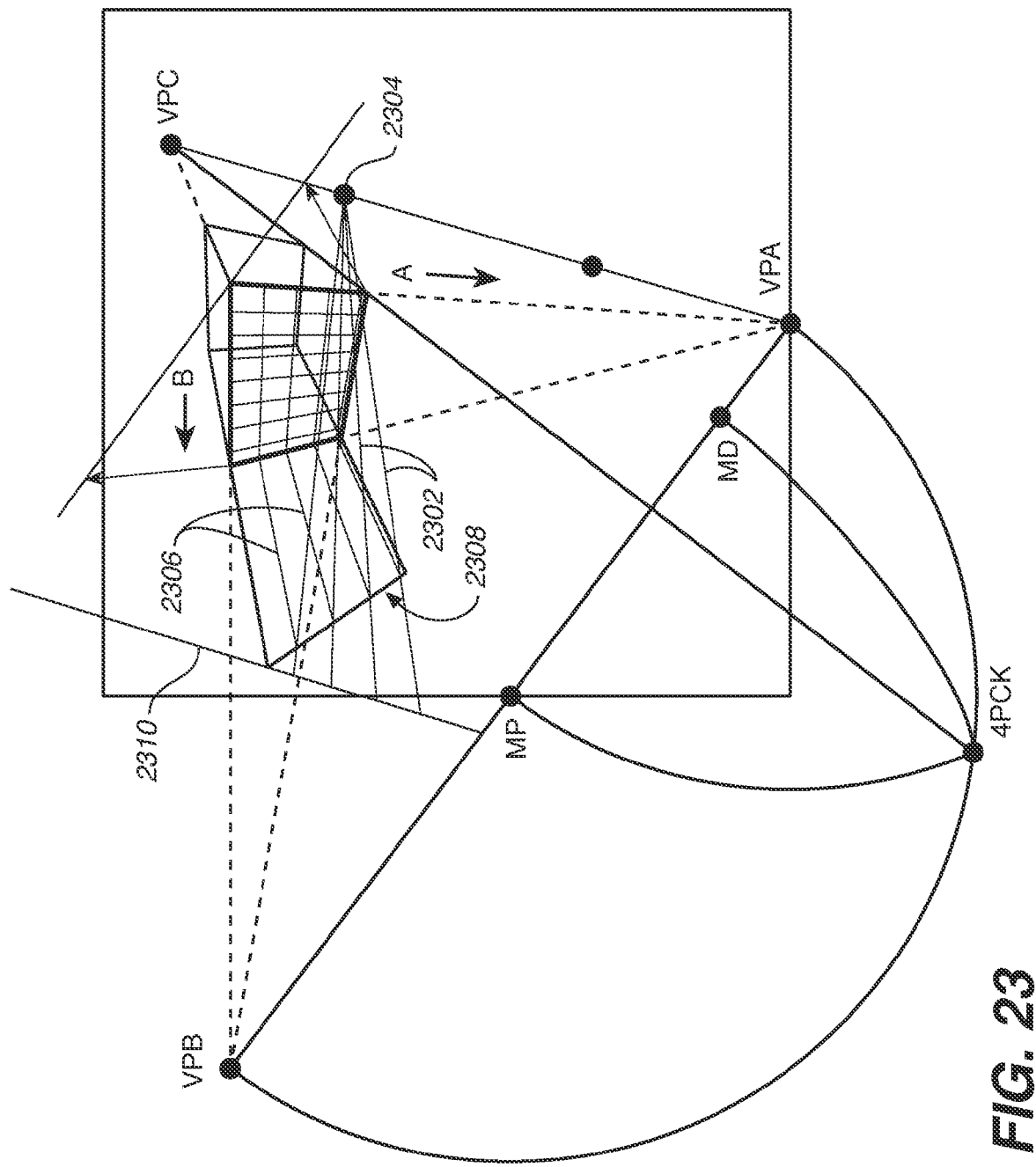
Figure 24:
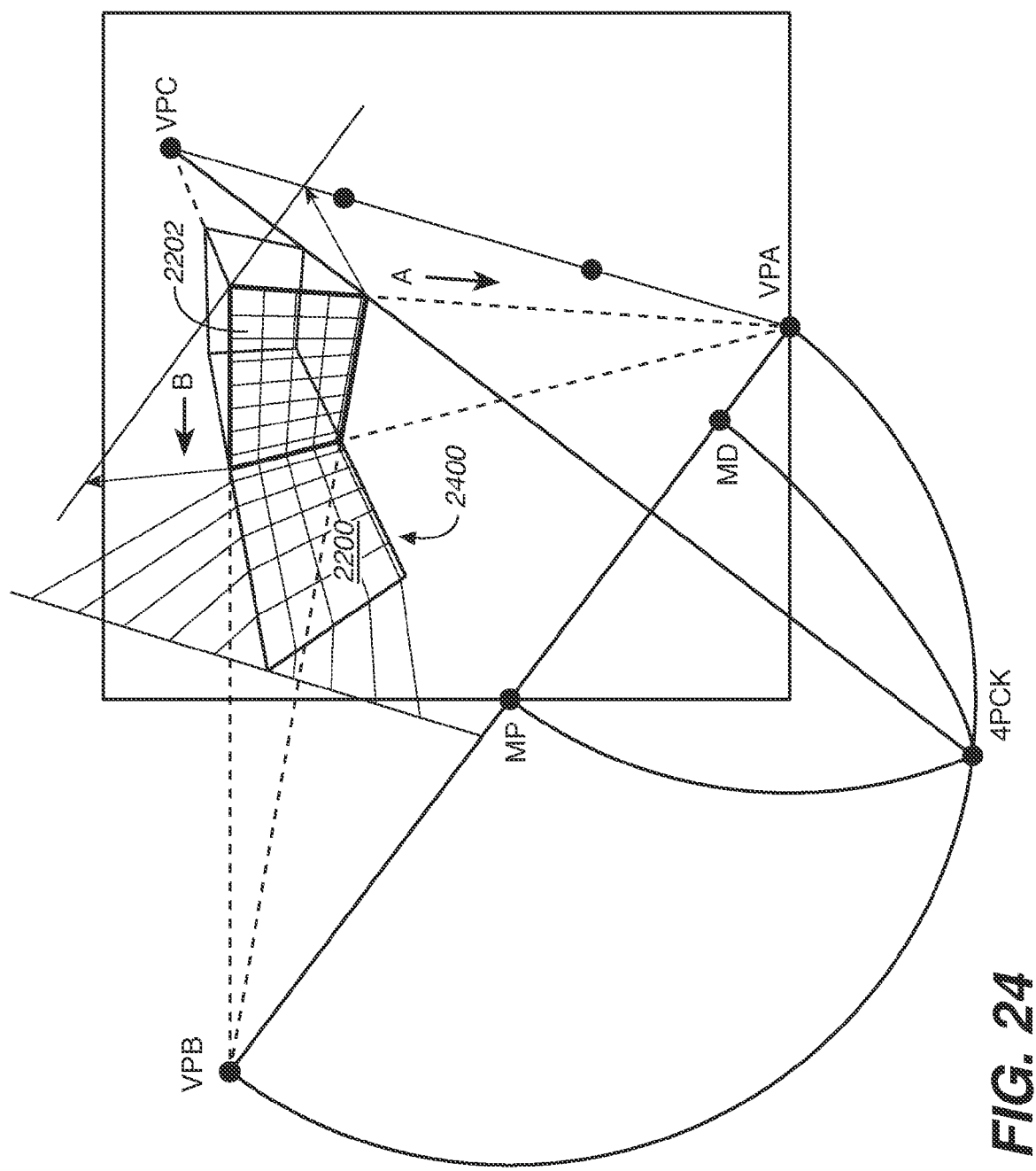

The measure points are calculated in a similar manner as those in the source perspective area, with the measure bar being placed at the SO of the destination perspective area. However, the scale on this measure bar needs to be calibrated. The grid lines on the source perspective area are projected onto the destination perspective area, as shown in FIG. 23. Lines 2302 from the measure point 2304 through intersections of the grid lines 2306 at the edge 2308 are calculated and extended onto the measure bar 2310. This provides the size of the intervals on the measure bar. The distance of these intervals represent the same length as the intervals on the original measure bar. This information is used to generate a grid 2400, as shown in FIG. 24, and calculate the aspect ratio for the destination perspective area.

Having calibrated the grid across the perspective areas, the aspect ratio is inserted into the transformation from the destination perspective area to the unit square. Because all surfaces factor in their aspect ratio correction, the application can transfer objects from perspective area to perspective area through matrix multiplication.

As described above, the aspect ratio for the destination perspective ratio is based on the shared edge of the source and destination perspective areas, which constitutes a metric that relates size in one perspective area to size in the other. This function can be performed by any pair of line segments with a common vanishing point that the user identifies as having the same length.

Figure 25:
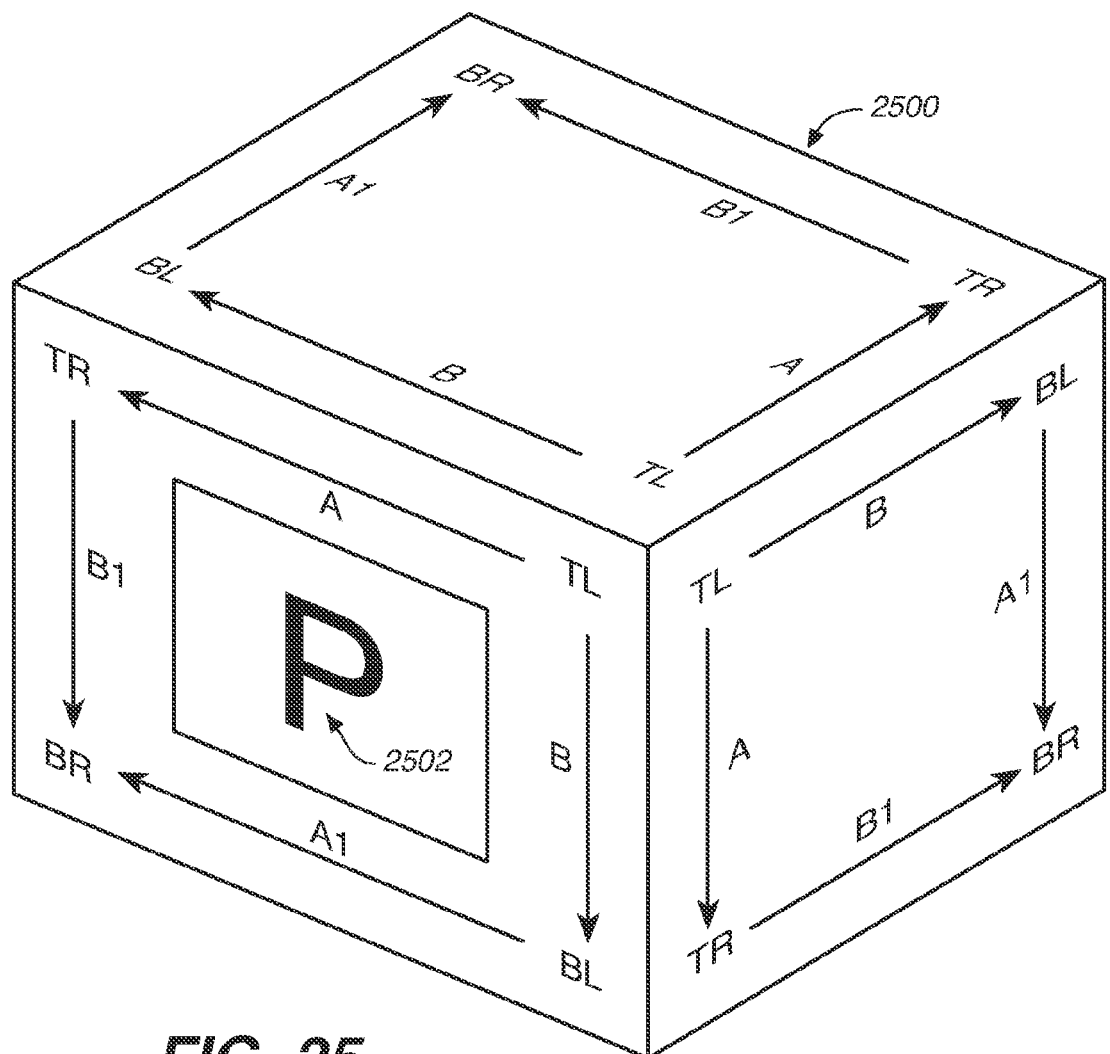
FIG. 25 shows a box with adjacent faces representing perspective areas.

FIG. 25 shows a box 2500 with adjacent faces representing perspective areas. When an object is moved across surfaces it is not only important to keep them sized properly, but also oriented correctly. To manage mapping between surfaces, when the transforms are requested from a surface, a destination surface is supplied. If the set of vanishing points for the two surfaces do not match, the nodes of the box are rotated left or right depending on the vanishing point that the two share. The management during tear-off of alternating the A-B designation sorts out the flipping that would otherwise occur.

Figure 26:
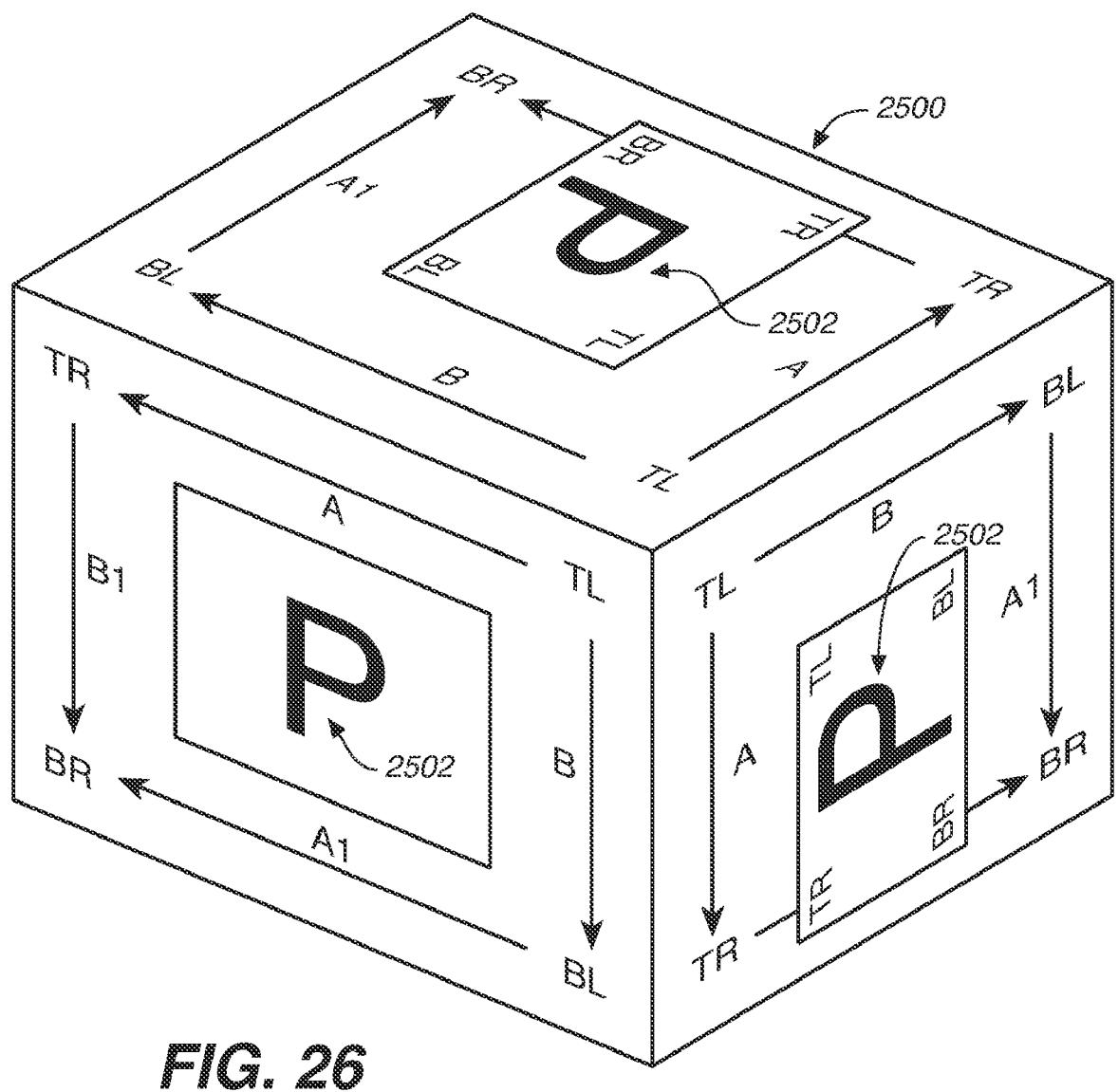
FIG. 26 shows a result of copying an object from a source perspective area to a destination perspective area without accounting for orientation.
Figure 27:
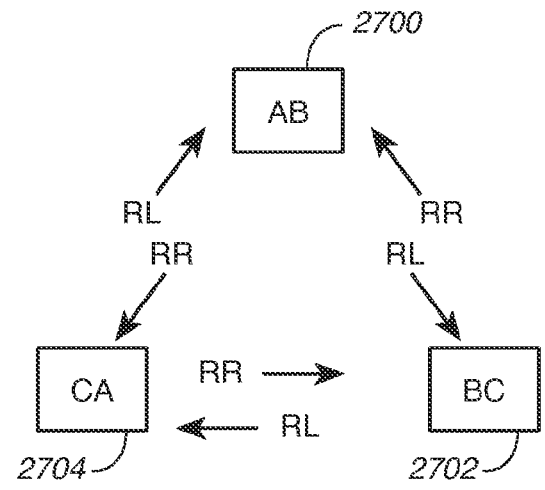
FIG. 27 shows a technique for accounting for orientation when copying an object from a source perspective area to a destination perspective area.

In FIG. 25, the object "P" 2502 represents some object to be moved from one surface to another surface. The default point to point mapping (i.e., SO to SO, ST to ST, A1o to A1o, etc.) of this image onto the other surfaces would result in some undesired rotation changes when the object 2502 is moved across perspective areas, as shown in FIG. 26. To avoid this, the application performs a rotation of the corner mapping and exchange of the aspect ratio axis as shown in FIG. 27. Here, AB 2700 represents a plane with VPA and VPB, BC 2702 represents a plane with VPB and VPC, and CA 2704 represents a plane with VPC and VPA. The arrows indicate whether to rotate the corner mapping for the plane to the right (RR) or the left (RL) based on the direction of the exchange between the planes.

Once a perspective area is created, the user may edit the area. When there is only one surface, the application allows free movement of all of the nodes. Apart from simple area resizing, the act of editing a perspective area becomes complex. This complexity increases if there are multiple related planes.

If there are two or more surfaces, the application breaks up editing operations into two parts, origin edits and endpoint edits. The endpoint of a ray is defined by where the ray intersects another ray in the box.

Figure 28:
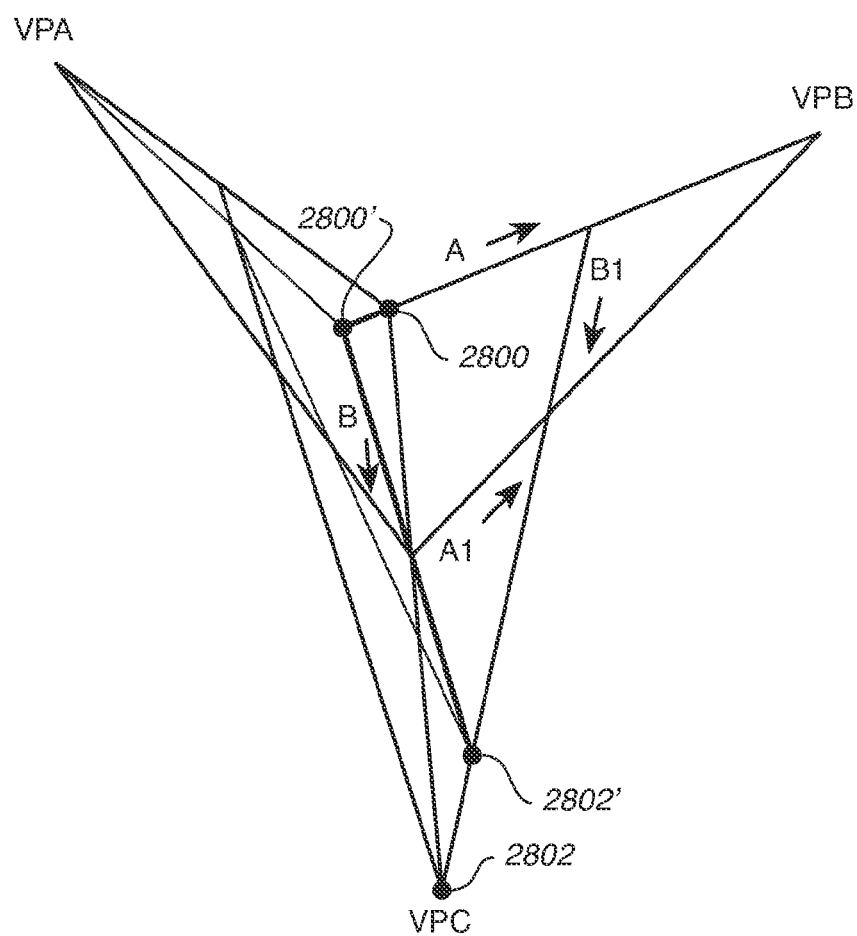
FIG. 28 illustrates the affect of editing a perspective area on an adjacent perspective area.
Figure 29:
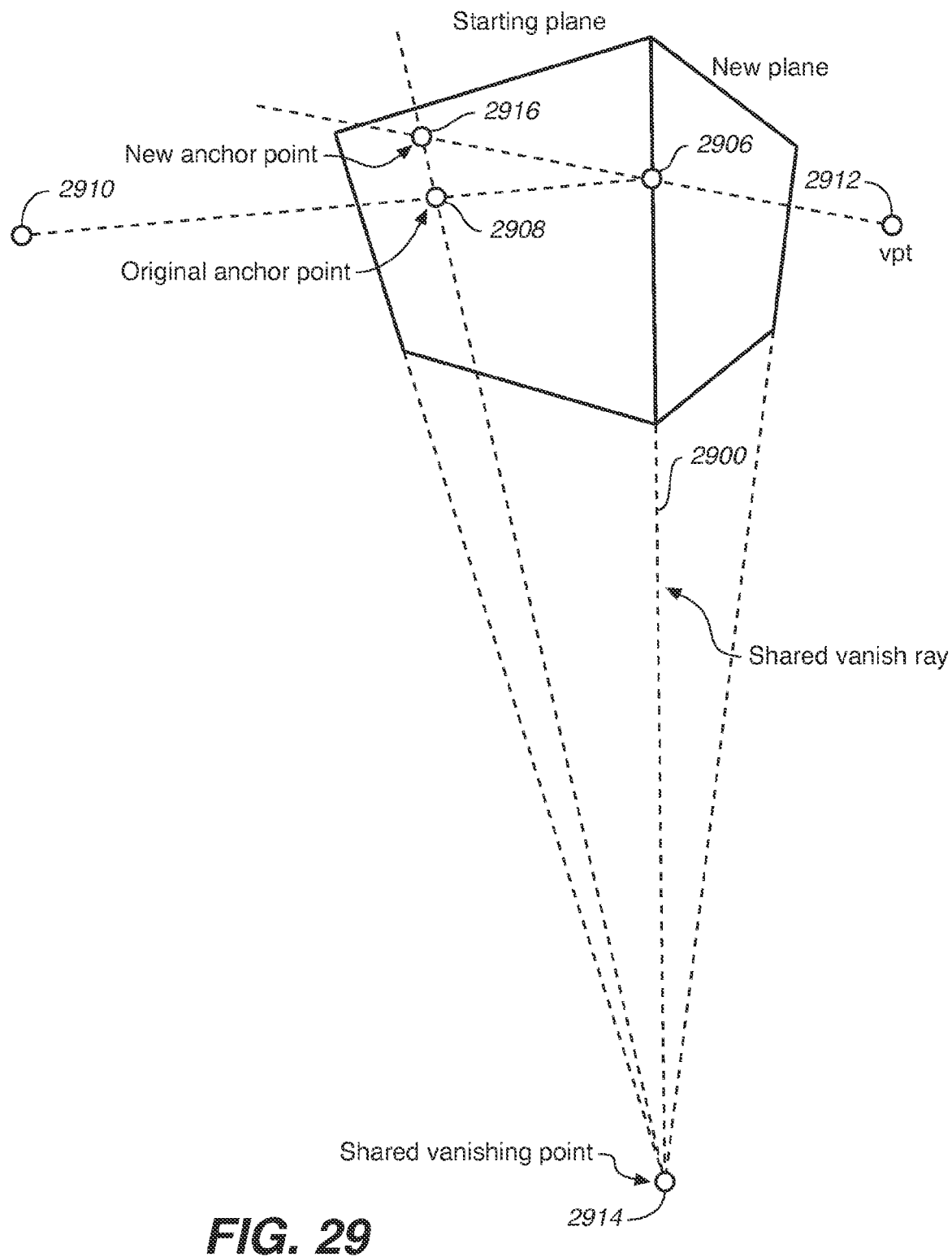
FIG. 29 illustrates a technique for determining a new anchor point when constraining movement of an object across perspective areas.

In FIG. 28, when ray B's origin 2800 is moved, VPC 2802 is moved. In the connected perspective area 2804, the origins of the rays pointing at VPC are moved to match. In a similar way if an endpoint is moved, the endpoint is moved in related surfaces. There are some corner moves that move an origin and an endpoint. When there are two surfaces, the application may restrict movement so that only one vanishing point is edited at any given time.

The constraint that can be applied to constrain motion of an element in the horizontal or vertical direction in the unit square as it is being moved can be extended to work across multiple related planes. If left alone, the original anchor point has no meaning when the element is moved to another plane so it must be adjusted to reflect the change. In one implementation, the shared vanish ray 2900 for the two surfaces, a source plane 2902 and a destination plane 2904, is identified. The intersection point 2906 from the original anchor point 2908 and the source plane's non-shared vanishing point 2910 and the shared vanish ray 2900 is calculated. The intersection of this point and the destination plane's non-shared vanishing point 2912 and the shared vanishing point 2914 and the original anchor point is then calculated. This intersection is the anchor point 2916 for the other plane.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The invention has been described in terms of particular embodiments, but other embodiments can be implemented and are within the scope of the following claims. For example, the operations of the invention can be performed in a different order and still achieve desirable results. As one example, the processes depicted in FIGS. 3 and 14 do not require the particular order shown, or sequential order, to achieve desirable results. Other embodiments are within the scope of the following claims.

What is claimed is:

1. A computer system comprising:
    a one or more computers; and
    a storage device storing a computer program which, when executed by the one or more computers, causes the one or more computers to perform operations comprising:
    displaying a two-dimensional image defined on a picture plane;
    receiving a user editing input requesting an editing operation on the image, the editing operation comprising copying an object from a source perspective area in the image, the object being a two-dimensional graphic object having an original shape in the image, the source perspective area being one or more regions within the image that have a common source perspective definition, the source perspective area being part and not all of the image; and
    transforming the object to have a destination shape at a destination location according to the editing operation, the destination location being outside the source perspective area, the destination shape being calculated based on the source perspective definition.

2. The computer system of claim 1, wherein:
    the destination location is a location within the image.

3. The computer system of claim 1, wherein:
    the source perspective definition is defined by a source perspective plane, the source perspective plane being a plane that is not the picture plane; and
    the computer program, when executed by the one or more computers, further causes the one or more computers to receive a user input defining the source perspective area.

4. The computer system of claim 3, wherein:
    the instructions operable to cause the system to receive a user input defining the source perspective area comprise instructions to receive input defining the source perspective area by a pair of vanishing points and a perimeter enclosing one or more regions of the image.

5. The computer system of claim 1, wherein:
    the destination location is in the source perspective area.

6. The computer system of claim 1, wherein:
    the editing operation comprises placing an object at the destination location within a destination perspective area within the image, the object being a two-dimensional graphic object having an original shape, the destination perspective area being one or more regions within the image that have a common destination perspective definition; and
    the destination shape and size are also calculated based on the destination perspective definition and the destination location.

7. The computer system of claim 6, wherein:
    the source perspective definition comprises a perspective transform that maps from the source perspective area to a unit square; and
    the destination perspective definition comprises a perspective transform that maps from the unit square to the destination perspective area.

8. The computer system of claim 7, wherein:
    the transformation for the source perspective definition is represented as a first matrix; and
    the transformation for the destination perspective definition is represented as a second matrix.

9. The computer system of claim 8, wherein:
    the instructions operable to cause the system to transform the object comprise instructions to multiply the first matrix and the second matrix.

10. A computer system comprising:
    one or more computers; and
    a storage device storing computer program which, when executed by the one or more computers, causes the one or more computers to perform operations comprising:
    displaying a two-dimensional image;
    displaying an object in a first perspective area in the image, the object being a two-dimensional graphic object having a shape and a size, the first perspective area being defined by one or two vanishing points, the first perspective area being part and not all of the image; and
    constraining movement of the object directionally according to a first ray while the object is within the first perspective area, the first ray terminating at one of the vanishing points.

11. The computer system of claim 10, wherein:
    the first perspective area has a first perspective definition, and
    the computer program, when executed by the one or more computers, causes the one or more computers to perform further operations comprising:
    reshaping and resizing the object as the object is moved within the first perspective area by transforming the object to have a shape and size calculated based on the first perspective definition and the location of the object in the first perspective area.

12. The computer system of claim 10, wherein the computer program, when executed by the one or more computers, causes the one or more computers to perform further operations comprising:

displaying a second perspective area in the image, the second perspective area sharing an edge with the first perspective area and being associated with one of the vanishing points defining the first perspective and another vanishing point; and identifying a second ray in the second perspective area, the second ray terminating at said another vanishing point and intersecting the first ray in the first perspective area at the shared edge; and constraining movement of the object while the object is in the second perspective area according to the second ray.

13. The computer system of claim 10, wherein:

the object comprises an editing tool cursor.

14. The computer system of claim 13, wherein:

the editing tool cursor operates on the image according to the size and shape of the cursor.

* * * * *